(12) United States Patent
Elbsat

(10) Patent No.: US 11,761,663 B2
(45) Date of Patent: Sep. 19, 2023

(54) HVAC SYSTEM FOR REDUCING INTRA-SPACE VARIATION OF CONTROLLED ENVIRONMENTAL CONDITIONS

(71) Applicant: Johnson Controls Tyco IP Holdings LLP, Milwaukee, WI (US)

(72) Inventor: Mohammad N. Elbsat, Milwaukee, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 17/531,601

(22) Filed: Nov. 19, 2021

(65) Prior Publication Data

US 2023/0160596 A1    May 25, 2023

(51) Int. Cl.
*F24F 11/83*    (2018.01)
*F24F 11/67*    (2018.01)
(Continued)

(52) U.S. Cl.
CPC .............. *F24F 11/67* (2018.01); *F24F 11/83* (2018.01); *F24F 2110/10* (2018.01); *F24F 2120/10* (2018.01)

(58) Field of Classification Search
CPC ........ F24F 11/97; F24F 11/83; F24F 2120/10; F24F 2110/10; F24F 11/46; F24F 11/63; F24F 11/64
See application file for complete search history.

(56) References Cited

U.S. PATENT DOCUMENTS 9,447,985 B2    9/2016  Johnson
10,871,756 B2   12/2020  Johnson et al.
(Continued)

FOREIGN PATENT DOCUMENTS

CA    2957726 A1    3/2016
CA    3043996 A1    2/2018
(Continued)

OTHER PUBLICATIONS

U.S. Appl. No. 17/388,776, filed Jul. 29, 2021, Johnson Controls Tyco IP Holdings LLP.
(Continued)

*Primary Examiner* — Alicia M. Choi
(74) *Attorney, Agent, or Firm* — Foley & Lardner LLP

(57) ABSTRACT

An HVAC system includes a plurality of heat transfer devices operable to transfer heat into or out of the plurality zones. The HVAC system includes a controller configured to obtain a heat map indicating zone temperatures, use a thermal model of the building space to predict the zone temperatures as a function of control decisions indicating an amount of heat to transfer into or out of each of the plurality of zones by the plurality of heat transfer devices, determine the amount of heat to transfer into or out of each of the plurality of zones subject to a constraint or penalty based on differences between the zone temperatures predicted to result from the control decisions, and operate the heat transfer devices to transfer the amount of heat into or out of each of the plurality of zones in accordance with the control decisions.

17 Claims, 13 Drawing Sheets

(51) Int. Cl.
  *F24F 120/10* (2018.01)
  *F24F 110/10* (2018.01)

(56) References Cited

U.S. PATENT DOCUMENTS

| | | | |
|---|---|---|---|
| 10,908,578 | B2 | 2/2021 | Johnson et al. |
| 10,921,768 | B2 | 2/2021 | Johnson et al. |
| 11,156,978 | B2 | 10/2021 | Johnson et al. |
| 2003/0055798 | A1 | 3/2003 | Hittle et al. |
| 2008/0133061 | A1* | 6/2008 | Hoglund ............... F24F 11/63 700/277 |
| 2008/0277486 | A1* | 11/2008 | Seem ............... H04L 67/125 236/49.3 |
| 2010/0036533 | A1* | 2/2010 | Masuda ............... F24F 11/30 700/278 |
| 2013/0085614 | A1* | 4/2013 | Wenzel ............... G05B 13/021 700/277 |
| 2015/0100165 | A1* | 4/2015 | Federspiel ............... F24F 11/63 700/276 |
| 2020/0143491 | A1* | 5/2020 | Turney ............... G06Q 20/145 |
| 2020/0271347 | A1* | 8/2020 | Ioannou ............... F24F 11/80 |
| 2020/0340704 | A1* | 10/2020 | Ross ............... F24F 11/30 |
| 2021/0011443 | A1 | 1/2021 | McNamara et al. |
| 2021/0041127 | A1 | 2/2021 | Risbeck et al. |

FOREIGN PATENT DOCUMENTS

| | | | |
|---|---|---|---|
| CN | 109028470 A | * 12/2018 | ............... F24F 11/46 |
| EP | 1 156 286 A2 | 11/2001 | |
| EP | 3 186 687 A4 | 7/2017 | |
| EP | 3 497 377 A1 | 6/2019 | |
| WO | WO-2012/161804 A1 | 11/2012 | |
| WO | WO-2013/130956 A1 | 9/2013 | |

OTHER PUBLICATIONS

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.

(56) References Cited

OTHER PUBLICATIONS com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Afram et al., "Theory and Application of HVAC Control Systems—A review of Model Predictive Control (MPC)," Building and Environment, Feb. 2014, vol. 72 (pp. 343-355).
Ahn et al., "Optimal Control Development for Chilled Water Plants Using a Quadratic Representation," Energy and Buildings, Apr. 2001, vol. 33, No. 4 (pp. 371-378).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control, 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
EPO Search Opinion EP Appl. Ser. No. EP 22177772.5 dated Sep. 26, 2022 (6 pages).
Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Hackner, J.R., "HVAC system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Kelman et al., "Analysis of Local Optima in Predictive Control for Energy Efficient Buildings," Journal of Building Performance Simulation, Apr. 16, 2012, vol. 6, No. 3 (pp. 236-255).

Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Kwadzogah et al., "Model Predictive Control for HVAC Systems—A Review, 2013 IEEE International Conference on Automation Science and Engineering, Model Predictive Control for HVAC Systems—A Review," 2013 IEEE International Conference on Automation Science and Engineering (CASE), Madison, WI, United States, Aug. 17-20, 2013 (pp. 442-447).
McKenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).
Mossolly et al., "Optimal Control Strategy for a Multizone Air Conditioning System Using a Genetic Algorithm," Energy, Jan. 2009, vol. 34, No. 1 (pp. 58-66).
Nassif et al., "Optimization of HVAC Control System Strategy Using Two-Objective genetic Algorithm," International Journal of HVA C&R Research, vol. 11, No. 3 (pp. 459-486).
Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).
Stluka et al., "Energy Management for Buildings and Microgrids," 2011 50th IEEE Conference on Decision and Control and European Control Conference (CDCECC) Orlando, FL, USA, Dec. 12- 15, 2011 (pp. 5150-5157).
Strurznegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).
Wang et al., "Model-Based Optimal Control of VAV Air-Conditioning System Using Genetic Algorithm," Building and Environment, Aug. 2000, vol. 35, No. 6 (pp. 471-487).
Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).
Yao et al., "Global Optimization of a Central Air-Conditioning System Using Decomposition-Coordination Method," Energy and Buildings, May 2010, vol. 42, No. 5 (pp. 570-583).

* cited by examiner

HVAC SYSTEM FOR REDUCING INTRA-SPACE VARIATION OF CONTROLLED ENVIRONMENTAL CONDITIONS

BACKGROUND

Buildings are increasingly implementing variable refrigerant flow (VRF) systems into the building heating, ventilation, and air conditioning (HVAC) systems. This can generally increase efficiency compared to other techniques (e.g., duct-based HVAC systems, etc.) as the refrigerant can be supplied directly to the indoor units (IDU's) of the VRF system. Certain building zones may be equipped with multiple IDU's that are all configured to serve a single zone. These multiple IDU's may also be supplied conditioned air to reach a single setpoint, rather than individual setpoint for each of the multiple IDU's.

In such an example, each IDU may serve a particular zone of the building space, and each IDU is conditioning the air in their respective zone to reach a single setpoint. However, several factors (e.g., number of occupants, fenestration, location of occupants within the space, time of day, outside air temperature, etc.) can affect the spatial distribution of the temperature within the particular zones, creating an uneven heat map for the building space. To limit this, one or more of the setpoints of the particular zones in the building space may need to be adjusted. However, changing the zone temperature setpoint of a particular zone in a building space can have indirect effect on adjacent zones. Cost, occupant comfort, and energy efficiency may also be considered when adjusting the zone temperatures. Accordingly, there exists a need to determine the optimal IDU temperature distribution for all IDUs within a single space based on the heat map within the space.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a heating, ventilation, or air conditioning (HVAC) system for reducing temperature variation within a building space. The HVAC system includes a plurality of heat transfer devices distributed across a plurality of zones of the building space and operable to transfer heat into or out of the plurality zones. The HVAC system further includes a controller comprising one or more processing circuits configured to obtain a heat map indicating zone temperatures of the plurality of zones, use a thermal model of the building space to predict the zone temperatures as a function of control decisions indicating an amount of heat to transfer into or out of each of the plurality of zones by the plurality of heat transfer devices, determine the amount of heat to transfer into or out of each of the plurality of zones subject to a constraint or penalty based on differences between the zone temperatures predicted to result from the control decisions, operate the plurality of heat transfer devices to transfer the amount of heat into or out of each of the plurality of zones in accordance with the control decisions.

In some embodiments, determining the amount of heat to transfer into or out of each of the plurality of zones includes performing an optimization of an objective function subject to the constraint or penalty based on the differences between the zone temperatures predicted to result from the control decisions. In some embodiments, the control decisions indicating the amount of heat to transfer into or out of each of the plurality of zones by the plurality of heat transfer devices are generated as a result of performing the optimization.

In some embodiments, the heat map indicates which of the plurality of zones are located adjacent to each other and capable of exchanging heat with each other. In some embodiments, the thermal model of the building space is used to predict the zone temperatures as a function of an amount of heat transfer between two or more of the plurality of zones that are located adjacent to each other.

In some embodiments, the constraint or penalty includes a penalty term. In some embodiments, determining the amount of heat to transfer into or out of each of the plurality of zones comprises calculating a value of the penalty term based on the differences between the zone temperatures predicted to result from the control decisions.

In some embodiments, the constraint or penalty includes a temperature variation constraint that requires the differences between the zone temperatures predicted using the thermal model to be less than or equal to one or more threshold values. In some embodiments, determining the amount of heat to transfer into or out of each of the plurality of zones includes using the temperature variation constraint to prevent the controller from generating control decisions that would violate the temperature variation constraint.

In some embodiments, the one or more processing circuits are configured to determine an occupancy status of a zone of the plurality of zones, the occupancy status indicating whether the zone is occupied and adjust a value of the constraint or penalty associated with the zone based on the occupancy status.

In some embodiments, the one or more processing circuits are configured to estimate a plurality of heat load disturbances affecting the plurality of zones. In some embodiments, the thermal model of the building space is used to predict the zone temperatures as a function of the heat load disturbances.

In some embodiments, the plurality of heat transfer devices include indoor units of a variable refrigerant flow system, each of the indoor units located within a different zone of the plurality of zones.

Another implementation of the present disclosure is a method for operating a heating, ventilation, or air conditioning (HVAC) system to reduce temperature variation within a building space. The method includes obtaining a heat map indicating zone temperatures of a plurality of zones of the building space, using a thermal model of the building space to predict the zone temperatures as a function of control decisions indicating an amount of heat to transfer into or out of each of the plurality of zones, determining the amount of heat to transfer into or out of each of the plurality of zones subject to a constraint or penalty based on differences between the zone temperatures predicted to result from the control decisions, and operating a plurality of heat transfer devices distributed across the plurality of zones to transfer the amount of heat into or out of each of the plurality of zones in accordance with the control decisions.

In some embodiments, determining the amount of heat to transfer into or out of each of the plurality of zones includes performing an optimization of an objective function subject to the constraint or penalty based on the differences between the zone temperatures predicted to result from the control decisions. In some embodiments, the control decisions indicating the amount of heat to transfer into or out of each of the plurality of zones by the plurality of heat transfer devices are generated as a result of performing the optimization.

In some embodiments, the heat map indicates which of the plurality of zones are located adjacent to each other and capable of exchanging heat with each other. In some embodiments, the thermal model of the building space is used to predict the zone temperatures as a function of an amount of heat transfer between two or more of the plurality of zones that are located adjacent to each other.

In some embodiments, the constraint or penalty includes a penalty term. In some embodiments, determining the amount of heat to transfer into or out of each of the plurality of zones includes calculating a value of the penalty term based on the differences between the zone temperatures predicted to result from the control decisions.

In some embodiments, the constraint or penalty includes a temperature variation constraint that requires the differences between the zone temperatures predicted using the thermal model to be less than or equal to one or more threshold values and determining the amount of heat to transfer into or out of each of the plurality of zones includes using the temperature variation constraint to prevent the controller from generating control decisions that would violate the temperature variation constraint.

In some embodiments, the method includes determining an occupancy status of a zone of the plurality of zones, the occupancy status indicating whether the zone is occupied and adjusting a value of the constraint or penalty associated with the zone based on the occupancy status.

In some embodiments, the method includes estimating a plurality of heat load disturbances affecting the plurality of zones. In some embodiments, the thermal model of the building space is used to predict the zone temperatures as a function of the heat load disturbances.

Another implementation of the present disclosure is a heating, ventilation, or air conditioning (HVAC) controller for reducing temperature variation within a building space. The HVAC controller including one or more processing circuits configured to obtain a heat map indicating zone temperatures of a plurality of zones of the building space, use a thermal model of the building space to predict the zone temperatures as a function of control decisions indicating an amount of heat to transfer into or out of each of the plurality of zones, determine the amount of heat to transfer into or out of each of the plurality of zones subject to a constraint or penalty based on differences between the zone temperatures predicted to result from the control decisions, and operate a plurality of heat transfer devices distributed across the plurality of zones to transfer the amount of heat into or out of each of the plurality of zones in accordance with the control decisions.

In some embodiments, determining the amount of heat to transfer into or out of each of the plurality of zones includes performing an optimization of an objective function subject to the constraint or penalty based on the differences between the zone temperatures predicted to result from the control decisions. In some embodiments, the control decisions indicating the amount of heat to transfer into or out of each of the plurality of zones by the plurality of heat transfer devices are generated as a result of performing the optimization.

In some embodiments, the heat map indicates which of the plurality of zones are located adjacent to each other and capable of exchanging heat with each other. In some embodiments, the thermal model of the building space is used to predict the zone temperatures as a function of an amount of heat transfer between two or more of the plurality of zones that are located adjacent to each other.

In some embodiments, the constraint or penalty includes a penalty term, and determining the amount of heat to transfer into or out of each of the plurality of zones includes calculating a value of the penalty term based on the differences between the zone temperatures predicted to result from the control decisions.

In some embodiments, the one or more processing circuits are configured to determine an occupancy status of a zone of the plurality of zones, the occupancy status indicating whether the zone is occupied, and adjust a value of the constraint or penalty associated with the zone based on the occupancy status.

DETAILED DESCRIPTION

Overview

Figure 1:
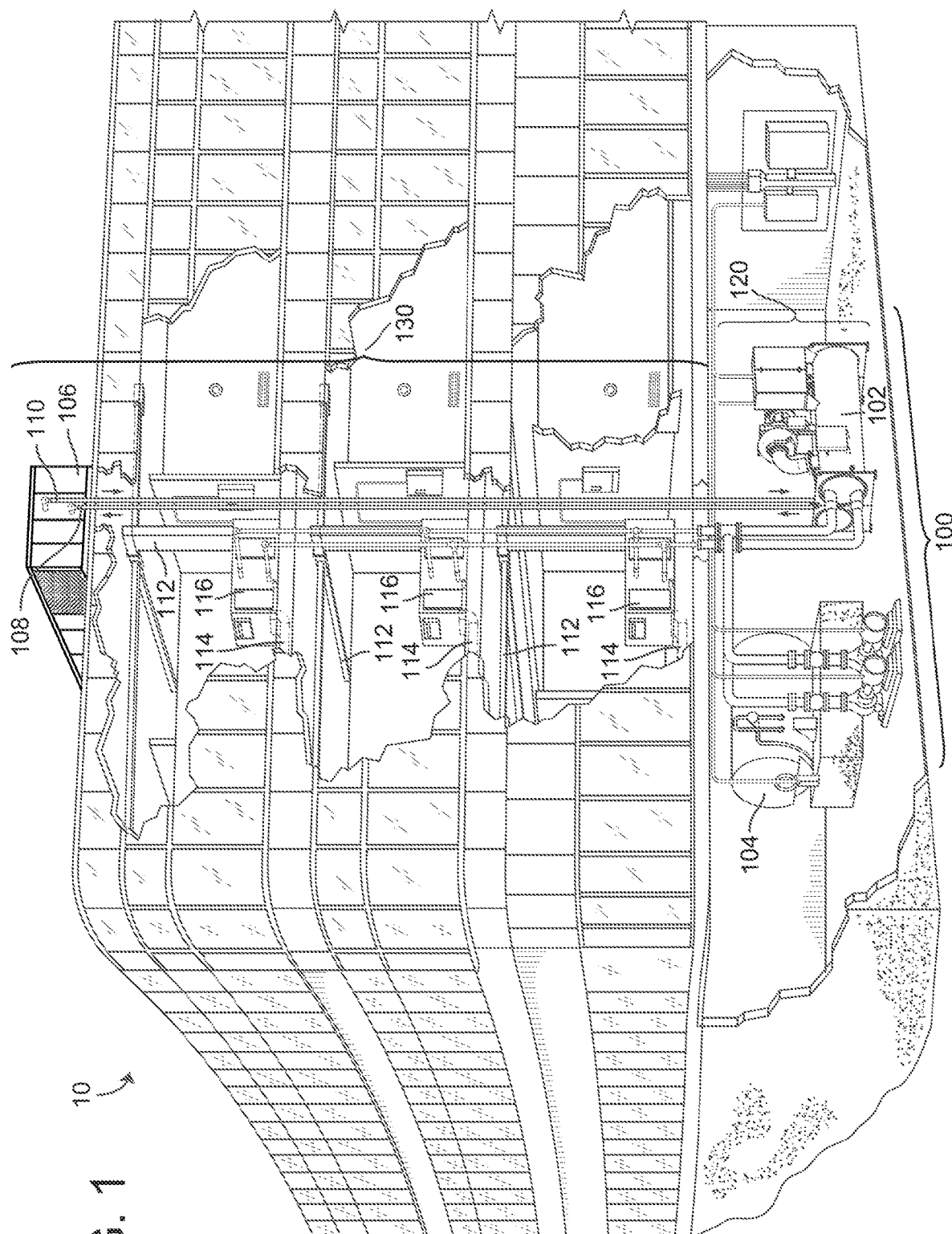
FIG. 1 is a drawing of a building with a heating, ventilation, or air conditioning (HVAC) system, according to some embodiments.

Before turning to the FIGURES, which illustrate certain exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

Referring generally to the FIGURES, systems and methods for obtaining (e.g., receiving, generating, etc.) a heat map for a building space (e.g., a building region including one or more zones, etc.) served by two or more indoor units (IDUs) and determining an optimal setpoint for the IDUs in the building space is shown, according to some embodiments. The determination of the setpoints for some or all of the IDUs may be dependent on heat data associated with the building space (e.g., via the obtained heat map, etc.). In some embodiments, an objective of the systems and methods described herein is to minimize the temperature variation throughout the heat map of the building space. Temperature variation in a building space may be caused by a host of factors, such as the number of building occupants present in a building space, the amount of sunlight entering the building space, and one or more windows being open in the building space.

One or more processing circuits may be configured to process the information from the obtained heat map and determine an optimal setpoint for each IDU in the building space such that the heat map with subsequently have uniform distribution (e.g., in order to avoid having very cold or very hot spots within the building space). The process may require near-continuous and/or continuous measurement of the heat map, which may serve as feedback for the one or more processing circuits for determining the control action. Advantageously, the techniques described herein increase comfort within the building spaces while allowing for a reduction in energy costs. In addition, the one or more processing circuits may be configured to "ignore" certain areas of the heat map where no occupants are located (e.g., for large building spaces, etc.) to avoid unnecessary cooling or heat in an unused area within the building space.

As described herein, the term "space" may refer to any general region located within a building, campus, home, or other structure. Typically, the term "space" refers to a region that includes multiple zones (e.g., smaller regions within the space, etc.). In some embodiments, these zones can be served by any number of heat transfer devices (e.g., IDUs, etc.) that can be configured to provide or remove heat from the zone(s). Zones may be served by one heat transfer device or multiple devices at a time. In particular, the term "zone" is not limited to a room (e.g., a zone surrounded by walls, etc.) within the space. In some embodiments, the term "space" refers to an open floor plan space (e.g., a cafeteria, etc.) and the zones within the space are areas within the space. For example, the northeast corner of the open floor space, the southeast corner, the northwest corner, and the southwest corner are each a zone within the space. In some embodiments, the zones within a space may include both areas that are confined at least partially by walls—such as rooms, offices, etc.—and areas that are not confined by walls, such as open areas within an open floor space.

As described herein, the term "substantially equalize" may refer to substantially equalizing temperature and/or heat distribution throughout a building space. Substantially equalize may include equalizing the temperature completely (e.g., the entire building space is 71° at each location within the space), and may include equalizing the temperature substantially. Substantially, as referred to herein, may include the temperatures within multiple areas of the zone being within a predetermined threshold/range of one another. In one non-limiting example, this includes each of the temperatures within the space limited to a difference of 5% in variation. Of course, 5% is exemplary and should not be considered limiting, and the example could include any percentage (e.g., 10%, 20%, etc.). In another non-limiting example, this includes each of the temperatures being above or below a predetermined value, such as above 70° and below 72°.

It should be noted that while the systems and methods disclosed herein are generally using heat maps to achieve substantially equal temperature distribution within a space, this is merely meant to be exemplary and should not be considered limiting. In various other embodiments, other types of maps can be used either independently or in conjunction with heat maps to make control decisions. For example, the systems and methods disclosed herein may utilize air quality index maps to improve the air quality within the building (e.g., by reducing fine particulate matter, $PM_{2.5}$, by optimizing $CO_2$ mixing between zones within the building, etc.). This is described in greater detail with reference to FIG. 13.

Building Management System and HVAC System

Building Site

Referring now to FIG. 1, a perspective view of a building 10 is shown. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as central plant 200, described with reference to FIG. 2.

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant)

in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Figure 2:
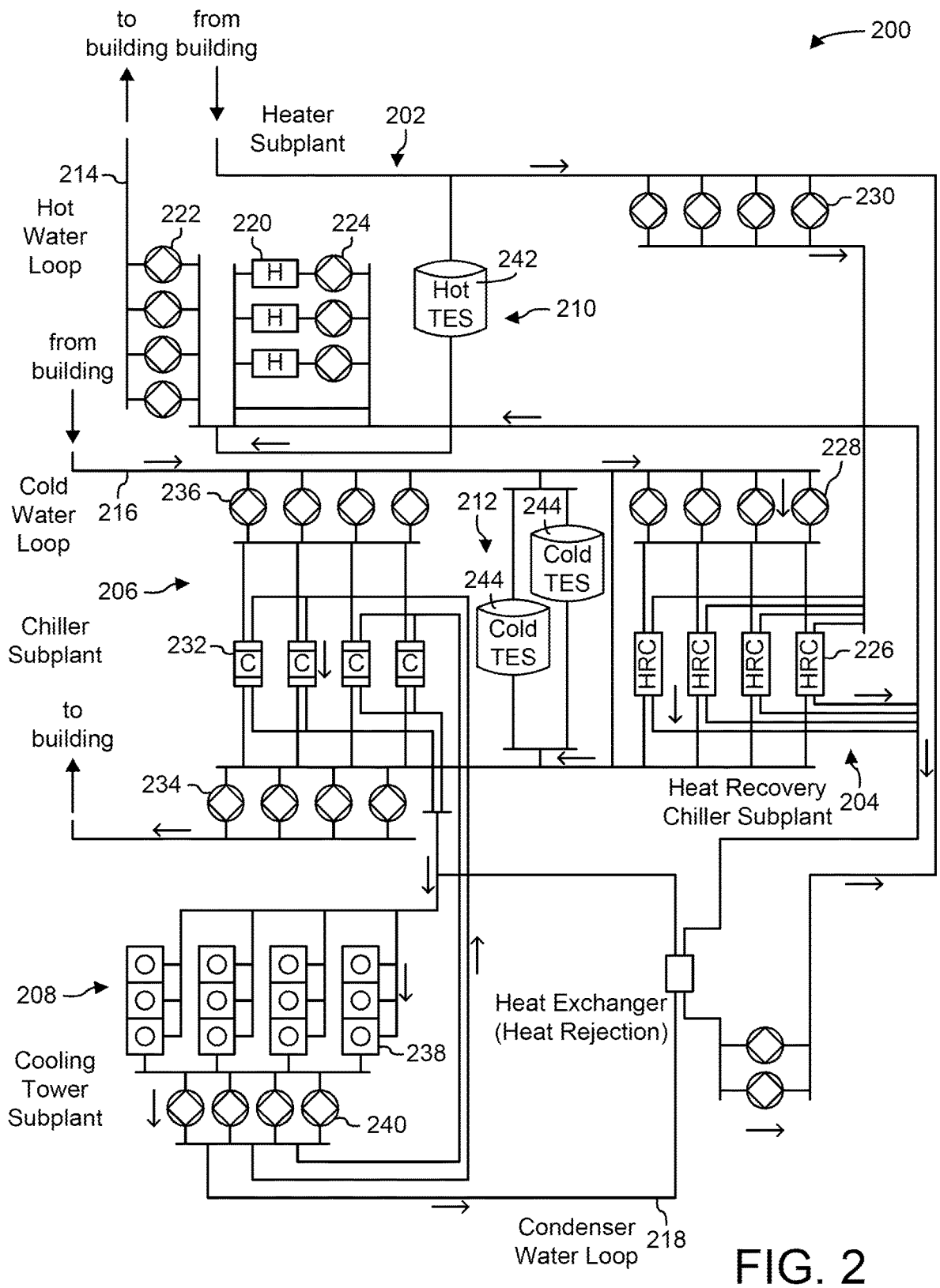
FIG. 2 is a schematic of a waterside system which can be used as part of the HVAC system of FIG. 1, according to some embodiments.

Referring now to FIG. 2, a block diagram of a central plant 200 is shown, according to an exemplary embodiment. In brief overview, central plant 200 may include various types of equipment configured to serve the thermal energy loads of a building or campus (i.e., a system of buildings). For example, central plant 200 may include heaters, chillers, heat recovery chillers, cooling towers, or other types of equipment configured to serve the heating and/or cooling loads of a building or campus. Central plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, central plant 200 may supplement or replace waterside system 120 in building 10 or may be implemented separate from building 10 (e.g., at an offsite location).

Central plant 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to central plant 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves may be integrated with the pumps or positioned upstream or downstream of the pumps to control the fluid flows in central plant 200. In various embodiments, central plant 200 may include more, fewer, or different types of devices and/or subplants based on the particular configuration of central plant 200 and the types of loads served by central plant 200.

Airside System

Figure 3:
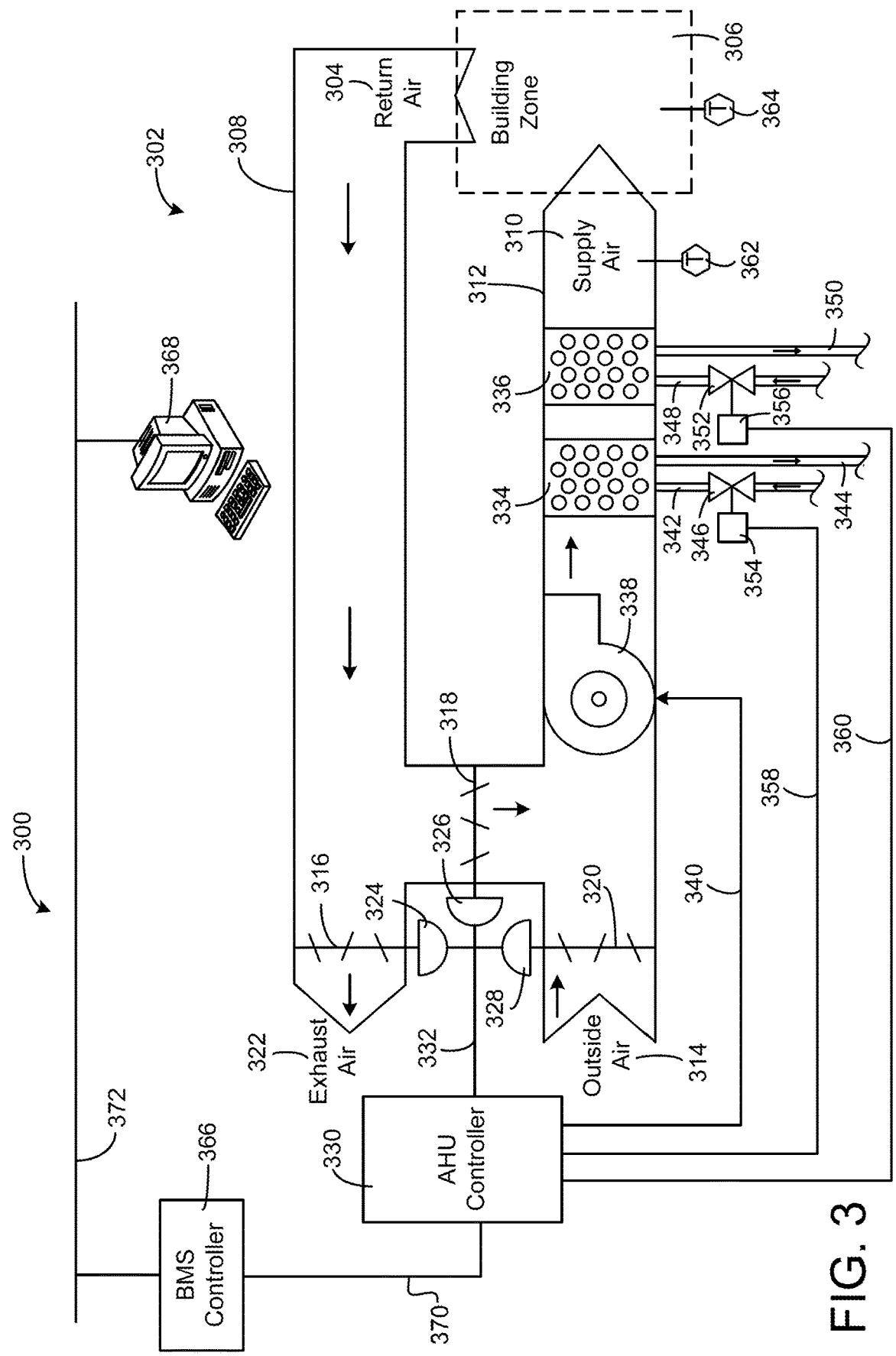
FIG. 3 is a diagram of an airside system, which can be used as part of the HVAC system of FIG. 1, according to some embodiments.

Referring now to FIG. 3, a block diagram of an airside system 300 is shown, according to an example embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Building Management System

Figure 4:
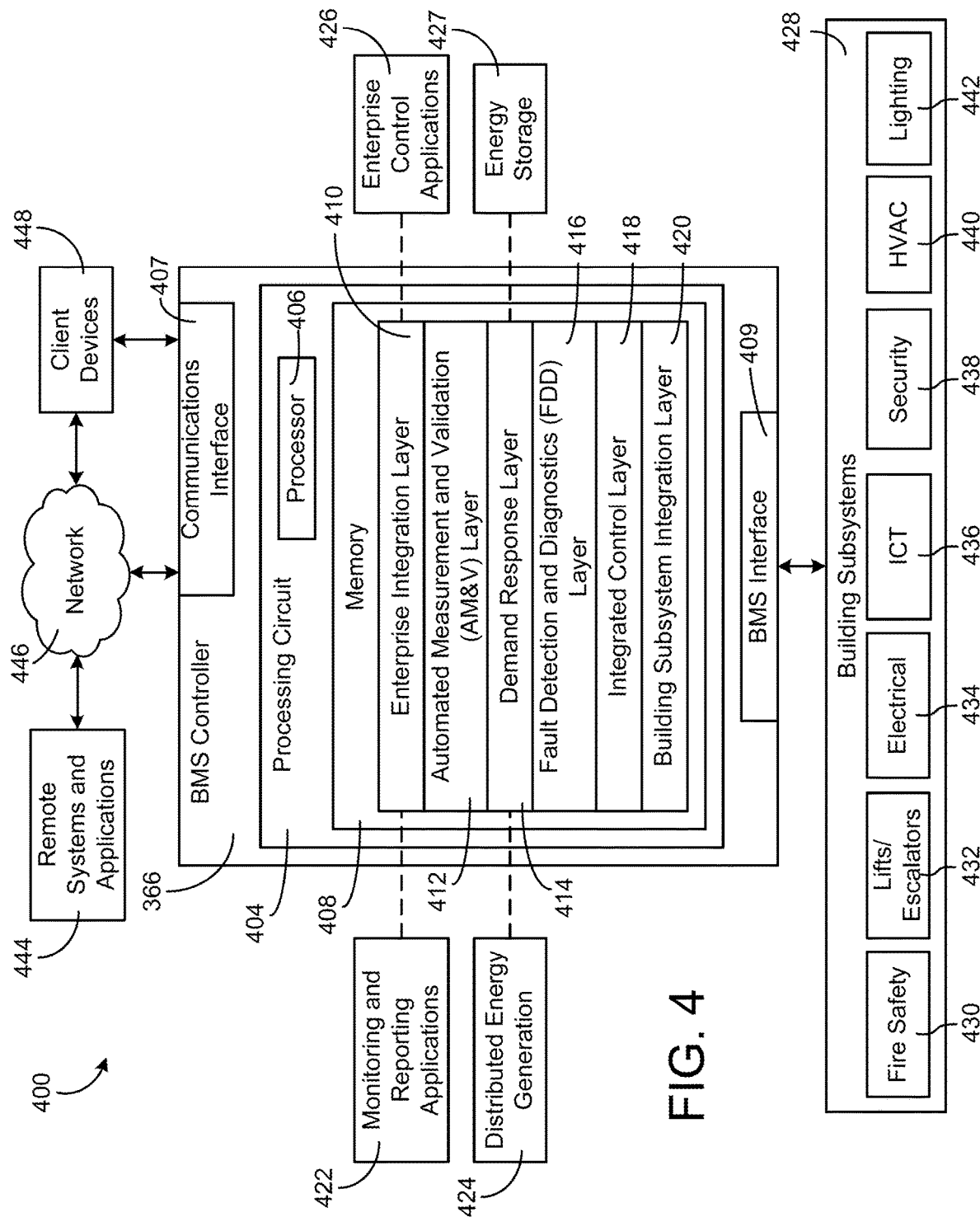
FIG. 4 is a block diagram of a building management system (BMS) which can be used in the building of FIG. 1, according to some embodiments.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing set points, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing set points) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what set points can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance.

Variable Refrigerant Flow (VRF) Systems

Figure 5:
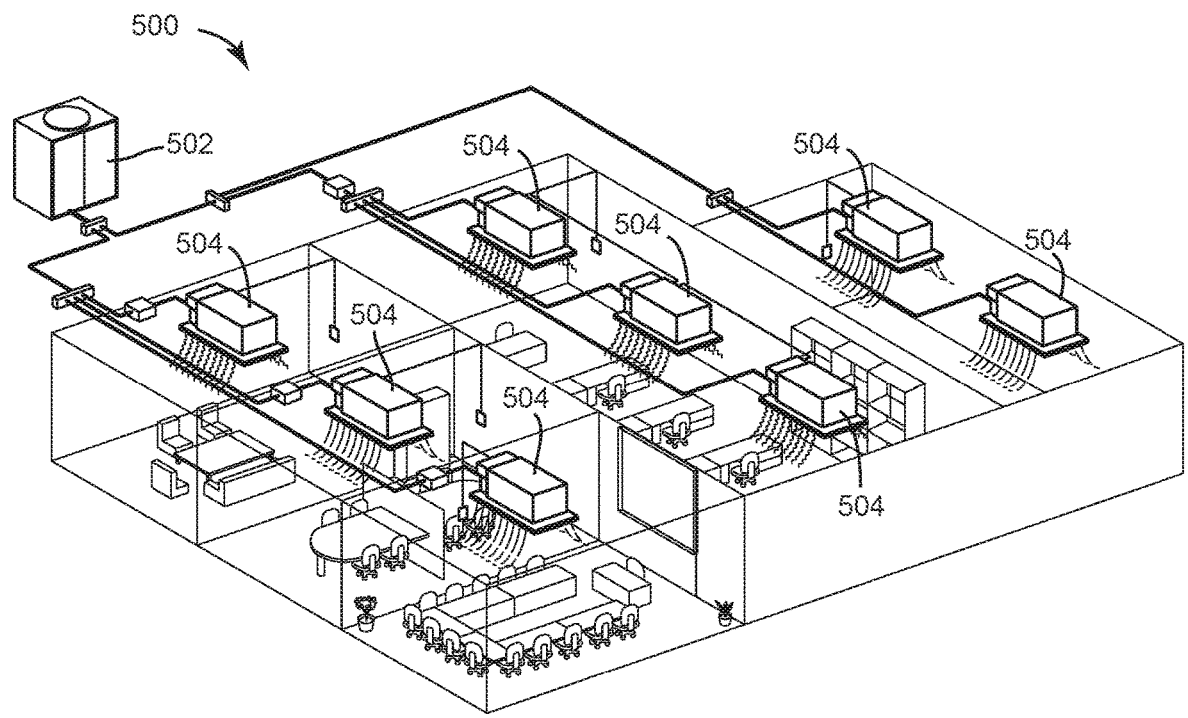
FIG. 5 is a diagram of a variable refrigerant flow (VRF) system, which can be implemented in the building of FIG. 1, according to some embodiments.
Figure 6:
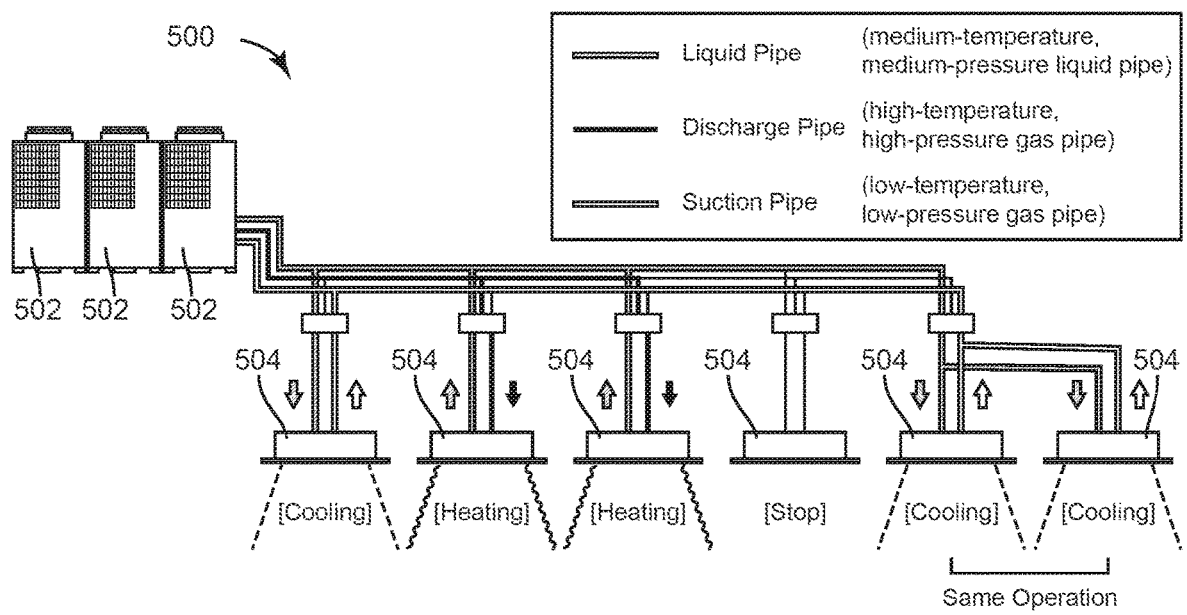
FIG. 6 is a diagram of a piping configuration for a VRF system, which can be implemented in the VRF system of FIG. 5, according to some embodiments.

Referring now to FIGS. 5-6, a variable refrigerant flow (VRF) system 500 is shown, according to some embodiments. VRF system 500 is shown to include one or more outdoor VRF units 502 and a plurality of indoor VRF units 504. Outdoor VRF units 502 can be located outside a building and can operate to heat or cool a refrigerant. Outdoor VRF units 502 can consume electricity to convert refrigerant between liquid, gas, and/or super-heated gas phases. Indoor VRF units 504 can be distributed throughout various building zones within a building and can receive the heated or cooled refrigerant from outdoor VRF units 502. Each indoor VRF unit 504 can provide temperature control for the particular building zone in which the indoor VRF unit 504 is located. Although the term "indoor" is used to denote that the indoor VRF units 504 are typically located inside of buildings, in some cases one or more indoor VRF units are located "outdoors" (i.e., outside of a building) for example to heat/cool a patio, entryway, walkway, etc.

One advantage of VRF system 500 is that some indoor VRF units 504 can operate in a cooling mode while other indoor VRF units 504 operate in a heating mode. For example, each of outdoor VRF units 502 and indoor VRF units 504 can operate in a heating mode, a cooling mode, or an off mode. Each building zone can be controlled independently and can have different temperature setpoints. In some embodiments, each building has up to three outdoor VRF units 502 located outside the building (e.g., on a rooftop) and up to 128 indoor VRF units 504 distributed throughout the building (e.g., in various building zones). Building zones may include, among other possibilities, apartment units, offices, retail spaces, and common areas. In some cases, various building zones are owned, leased, or otherwise occupied by a variety of tenants, all served by the VRF system 500.

Many different configurations exist for VRF system 500. In some embodiments, VRF system 500 is a two-pipe system in which each outdoor VRF unit 502 connects to a single refrigerant return line and a single refrigerant outlet line. In a two-pipe system, all of outdoor VRF units 502 may operate in the same mode since only one of a heated or chilled refrigerant can be provided via the single refrigerant outlet line. In other embodiments, VRF system 500 is a three-pipe system in which each outdoor VRF unit 502 connects to a refrigerant return line, a hot refrigerant outlet line, and a cold refrigerant outlet line. In a three-pipe system, both heating and cooling can be provided simultaneously via the dual refrigerant outlet lines. An example of a three-pipe VRF system is described in detail with reference to FIG. 7.

Figure 7:
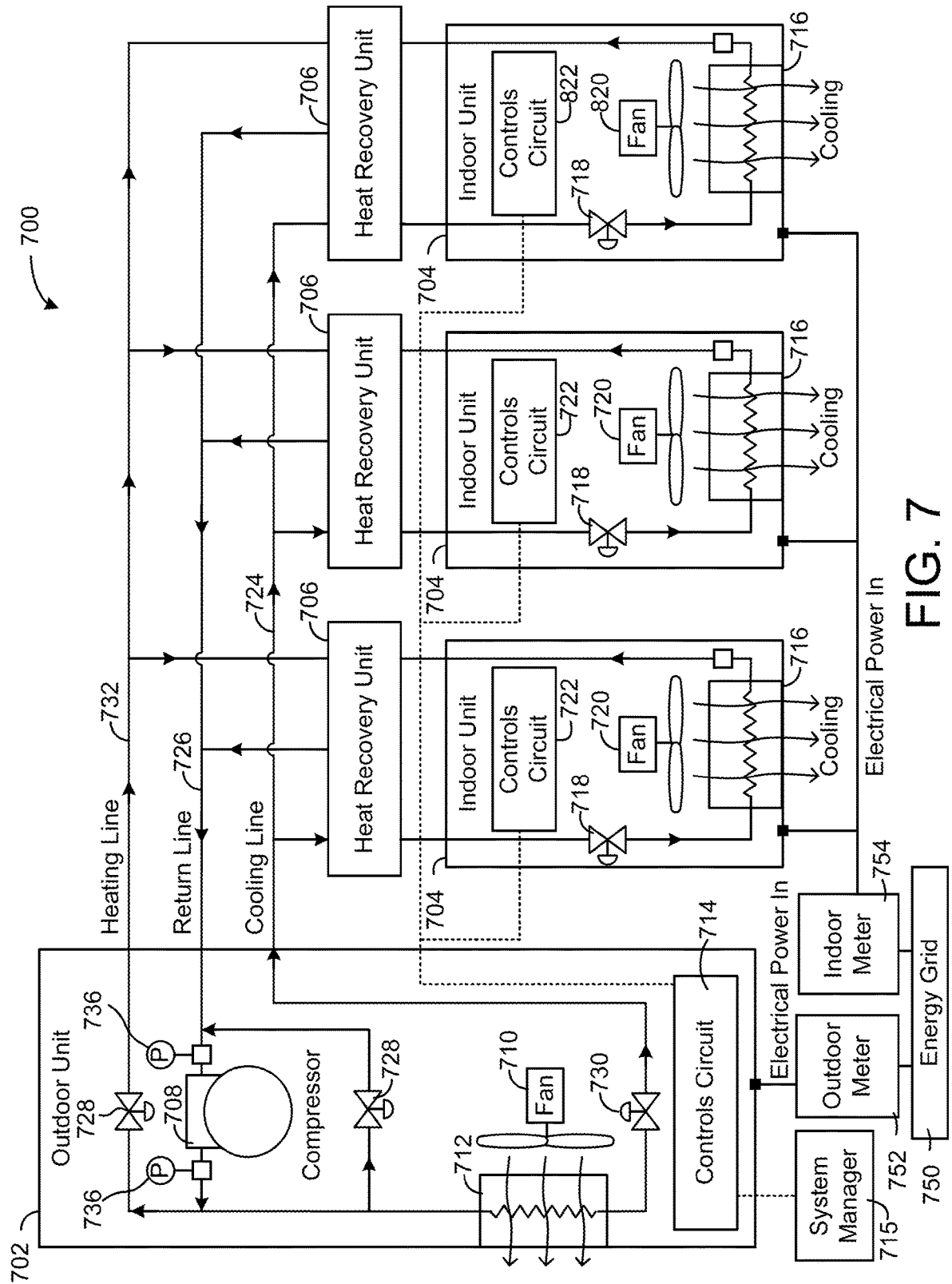
FIG. 7 is a diagram of an outdoor unit in communication with multiple indoor units, which can be implemented in the VRF system of FIG. 5, according to some embodiments.

Referring now to FIG. 7, a block diagram illustrating a VRF system 700 is shown, according to some embodiments. VRF system 700 is shown to include outdoor VRF unit 702, several heat recovery units 706, and several indoor VRF units 704. Outdoor VRF unit 702 may include a compressor 708, a fan 710, or other power-consuming refrigeration components configured to convert a refrigerant between liquid, gas, and/or super-heated gas phases. Indoor VRF units 704 can be distributed throughout various building zones within a building and can receive the heated or cooled refrigerant from outdoor VRF unit 702. Each indoor VRF unit 704 can provide temperature control for the particular building zone in which the indoor VRF unit 704 is located. Heat recovery units 706 can control the flow of a refrigerant between outdoor VRF unit 702 and indoor VRF units 704 (e.g., by opening or closing valves) and can minimize the heating or cooling load to be served by outdoor VRF unit 702.

Outdoor VRF unit 702 is shown to include a compressor 708 and a heat exchanger 712. Compressor 708 circulates a refrigerant between heat exchanger 712 and indoor VRF units 704. The compressor 708 operates at a variable frequency as controlled by outdoor unit controls circuit 714. At higher frequencies, the compressor 708 provides the indoor VRF units 704 with greater heat transfer capacity. Electrical power consumption of compressor 708 increases proportionally with compressor frequency.

Heat exchanger 712 can function as a condenser (allowing the refrigerant to reject heat to the outside air) when VRF system 700 operates in a cooling mode or as an evaporator (allowing the refrigerant to absorb heat from the outside air) when VRF system 700 operates in a heating mode. Fan 710 provides airflow through heat exchanger 712. The speed of fan 710 can be adjusted (e.g., by outdoor unit controls circuit 714) to modulate the rate of heat transfer into or out of the refrigerant in heat exchanger 712.

Each indoor VRF unit 704 is shown to include a heat exchanger 816 and an expansion valve 718. Each of heat exchangers 716 can function as a condenser (allowing the refrigerant to reject heat to the air within the room or zone) when the indoor VRF unit 704 operates in a heating mode or as an evaporator (allowing the refrigerant to absorb heat from the air within the room or zone) when the indoor VRF unit 704 operates in a cooling mode. Fans 720 provide airflow through heat exchangers 716. The speeds of fans 720 can be adjusted (e.g., by indoor unit controls circuits 722) to modulate the rate of heat transfer into or out of the refrigerant in heat exchangers 716.

In FIG. 7, indoor VRF units 704 are shown operating in the cooling mode. In the cooling mode, the refrigerant is provided to indoor VRF units 704 via cooling line 724. The refrigerant is expanded by expansion valves 718 to a cold, low pressure state and flows through heat exchangers 716 (functioning as evaporators) to absorb heat from the room or zone within the building. The heated refrigerant then flows back to outdoor VRF unit 702 via return line 726 and is compressed by compressor 708 to a hot, high pressure state. The compressed refrigerant flows through heat exchanger 712 (functioning as a condenser) and rejects heat to the outside air. The cooled refrigerant can then be provided back to indoor VRF units 704 via cooling line 724. In the cooling mode, flow control valves 728 can be closed and expansion valve 730 can be completely open.

In the heating mode, the refrigerant is provided to indoor VRF units 704 in a hot state. The hot refrigerant flows through heat exchangers 716 (functioning as condensers) and rejects heat to the air within the room or zone of the building. The refrigerant then flows back to outdoor VRF unit via cooling line 724 (opposite the flow direction shown in FIG. 7). The refrigerant can be expanded by expansion valve 730 to a colder, lower pressure state. The expanded refrigerant flows through heat exchanger 712 (functioning as an evaporator) and absorbs heat from the outside air. The heated refrigerant can be compressed by compressor 708 and provided back to indoor VRF units 704 in a hot, compressed state. In the heating mode, flow control valves 728 can be completely open to allow the refrigerant from compressor 708 to flow into a heating line.

As shown in FIG. 7, each indoor VRF unit 704 includes an indoor unit controls circuit 722. Indoor unit controls circuit 722 controls the operation of components of the indoor VRF unit 704, including the fan 720 and the expansion valve 718, in response to a building zone temperature setpoint or other request to provide heating/cooling to the building zone. For example, the indoor unit controls circuit 722 can generate a signal to turn the fan 720 on and off. Indoor unit controls circuit 722 also determines a heat transfer capacity required by the indoor VRF unit 704 and a frequency of compressor 708 that corresponds to that capacity. When the indoor unit controls circuit 722 determines that the indoor VRF unit 704 must provide heating or cooling of a certain capacity, the indoor unit controls circuit 722 then generates and transmits a compressor frequency request to the outdoor unit controls circuit 714 including the compressor frequency corresponding to the required capacity.

Outdoor unit controls circuit 714 receives compressor frequency requests from one or more indoor unit controls circuits 722 and aggregates the requests, for example, by summing the compressor frequency requests into a compressor total frequency. In some embodiments, the compressor frequency has an upper limit, such that the compressor total frequency cannot exceed the upper limit. The outdoor unit controls circuit 714 supplies the compressor total frequency to the compressor, for example, as an input frequency given to a DC inverter compressor motor of the compressor. The indoor unit controls circuits 722 and the outdoor unit controls circuit 714 thereby combine to modulate the compressor frequency to match heating/cooling demand. The outdoor unit controls circuit 214 may also generate signals to control valve positions of the flow control valves 728 and expansion valve 730, a compressor power setpoint, a refrigerant flow setpoint, a refrigerant pressure, on/off commands, staging commands, or other signals that affect the operation of compressor 708, as well as control signals provided to fan 710 including a fan speed setpoint, a fan power setpoint, an airflow setpoint, on/off commands, or other signals that affect the operation of fan 710.

Indoor unit controls circuits 722 and outdoor unit controls circuit 714 may store and/or provide a data history of one or more control signals generated by or provided to the controls circuits 714, 722. For example, indoor unit controls circuits 722 may store and/or provide a log of generated compressor request frequencies, fan on/off times, and indoor VRF unit 704 on/off times. Outdoor unit controls circuit 714 may store and/or provide a log of compressor request frequencies and/or compressor total frequencies and compressor runtimes.

The VRF system 700 is shown as running on electrical power provided by an energy grid 750 via an outdoor meter 752 and an indoor meter 754. According to various embodiments, the energy grid 750 is any supply of electricity (e.g., an electrical grid maintained by a utility company and supplied with power by one or more power plants, etc.). The outdoor meter 752 measures the electrical power consumption over time of the outdoor VRF unit 702, for example, in kilowatt-hours (kWh). The indoor meter 754 measures the electrical power consumption over time of the indoor VRF units 704, for example, in kWh. The VRF system 700 incurs energy consumption costs based on the metered electrical power consumption of the outdoor meter 752 and/or the indoor meter 754, as billed by the utility company that provides the electrical power. The price of electrical power (e.g., dollars per kWh) may vary over time. The VRF system 700 also includes a system manager 715. In some embodiments, system manager 715 is configured to minimize energy consumption costs for the VRF system 700 while also maintaining occupant comfort. While systems and methods disclosed herein are generally related to VRF systems, other systems may implement the commissioning methods disclosed herein.

Predictive Control Using Heat Maps

Figure 8:
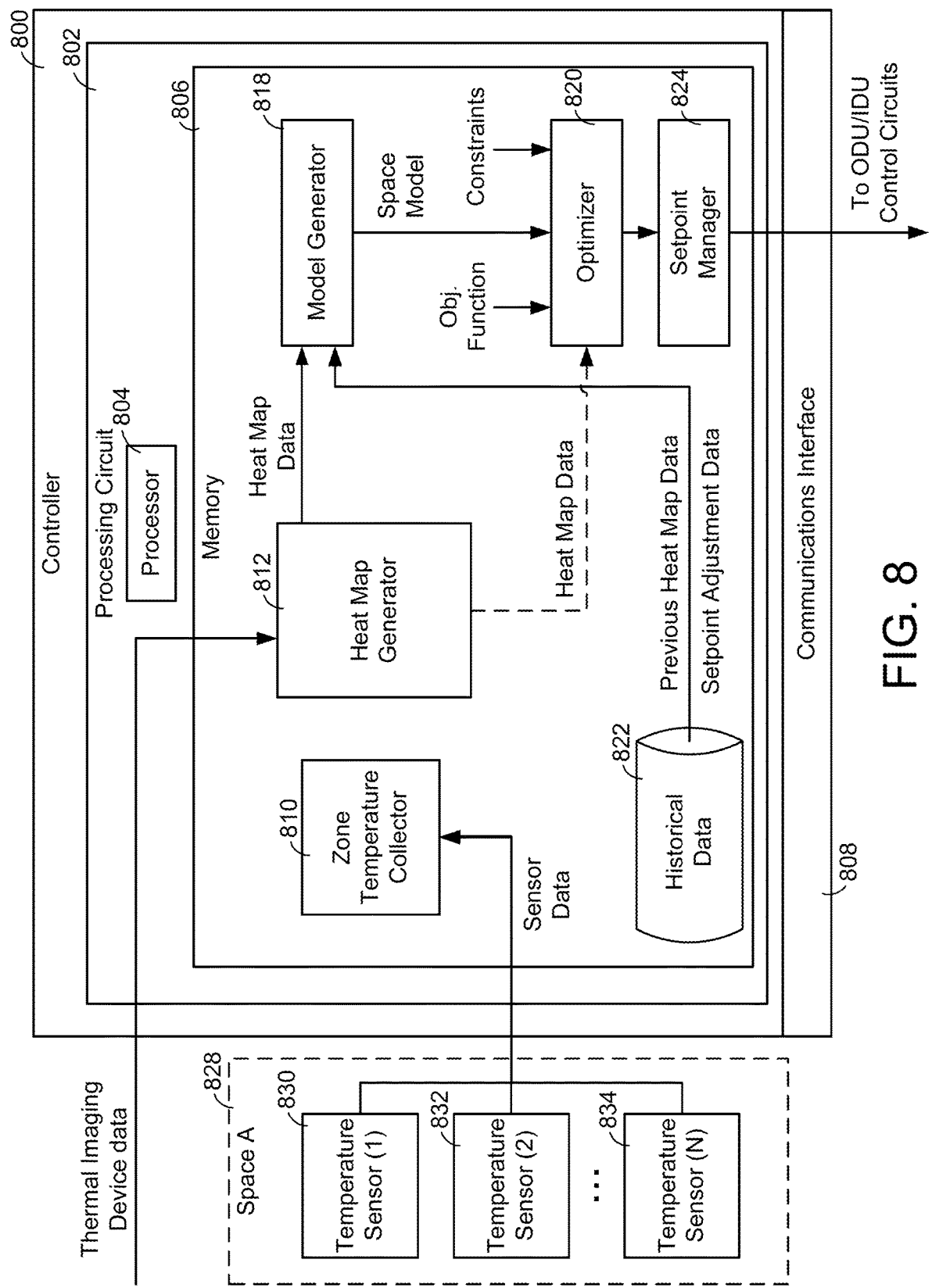
FIG. 8 is a block diagram of a controller for reducing intra-space variation of controlled environmental conditions, which can be implemented in the VRF system of FIG. 5, according to some embodiments.

Referring now to FIG. 8, a controller 800 for reducing temperature variations within a building space served by multiple heat transfer devices is shown, according to some embodiments. Controller 800 may be configured to obtain (e.g., generate, receive, etc.) a heat map and use information from the heat map to adjust control signals to heat transfer devices within the building space to achieve a more uniform temperature distribution. In some embodiments, this is performed to reduce energy costs within a building and to avoid unnecessary pockets of "hot" and/or "cold" regions.

It is worth noting that the systems and methods described herein are generally referring to heat transfer devices, such as IDUs. However, IDUs serving the zones described herein is merely meant to be exemplary and should not be considered limiting. Other types of heat transfer devices could be included/considered, such as IDUs, VAV units, radiators, window air conditioners, and resistive heating elements.

For example, a floor of building 10 may act as a building space with 6 6 heat transfer devices configured to provide heating/cooling to the space, where each VRF indoor unit serves a specific zone within the building space. Initially, the heat map indicates that there is an uneven heat distribution within the building space. The heat map is proceed to determine adjusted control signals to provide to the VRF indoor units that will better equalize the heat distribution within the building space.

Controller 800 is shown to include processing circuit 802 including (processor 804 and memory 806) and communications circuit 808. Processing circuit 802 can be communicably connected to communications interface 808 such that processing circuit 802 and the various components thereof can send and receive data via communications interface 808. Processor 804 can be implemented as a general purpose processor, an application specific integrated circuit (ASIC), one or more field programmable gate arrays (FPGAs), a group of processing components, or other suitable electronic processing components.

Communications interface 808 can be or include wired or wireless communications interfaces (e.g., jacks, antennas, transmitters, receivers, transceivers, wire terminals, etc.) for conducting data communications. In various embodiments, communications via communications interface 808 can be direct (e.g., local wired or wireless communications) or via a communications network (e.g., a WAN, the Internet, a cellular network, etc.). For example, communications interface can include an Ethernet card and port for sending and receiving data via an Ethernet-based communications link or network. In another example, communications interface 808 can include a Wi-Fi transceiver for communicating via a wireless communications network. In another example, communications interface 808 can include cellular or mobile phone communications transceivers.

Memory 806 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present disclosure. Memory 806 can be or include volatile memory or non-volatile memory. Memory 806 can include database components, object code components, script components, or any other type of information structure for supporting the various activities and information structures described in the present disclosure. According to an example embodiment, memory 806 is communicably connected to processor 806 via processing circuit 802 and includes computer code for executing (e.g., by processing circuit 802 and/or processor 804) one or more processes described herein. In some embodiments, controller 800 is implemented within a single computer (e.g., one server, one housing, etc.). In various other embodiments controller 800 can be distributed across multiple servers or computers (e.g., that can exist in distributed locations). Memory 806 is shown to include zone temperature collector 810, heat map generator 812, model generator 818, historical database 824, and setpoint manager 826.

Zone temperature collector 810 may be configured to receive temperature data from temperature sensors within space 828. In some embodiments, space 828 is a space (e.g., floor, area, region, large room such as an auditorium, cafeteria, theater, gymnasium, etc.) of building 10 that can include any number of zones. For example, space 828 can be an entire floor of building 10 with each office acting as a zone within space 828. As another example, space 828 can be a single large room with no internal walls within space 828 or minimal internal walls within space 828 dividing the different zones within space 828. Minimal internal walls may be defined as internal walls that do not interrupt or prevent airflow or air circulation between the different zones within space 828. As such, the air within space 828 may be permitted to flow between the different zones unimpeded. Of course while not shown, controller 800 may also be aware of the temperature setpoints currently set on any of the heat transfer devices and/or ODUs within space 828. In some embodiments, controller 800 obtains sufficient temperature measurements and other temperature data (e.g., from one or more thermal imaging devices, etc.) to adequately generate a heat map of space 828. Zone temperature collector may be configured to provide the temperature data from each and any zone within space 828 to heat map generator 812.

Heat map generator 812 may be configured to generate one or more heat maps of space 828. It should be noted that a variety of thermal imaging devices can be used to generate a heat map of a building space. In general, a thermal imaging device can detect infrared energy emitted, reflected, or transmitted by all materials. Thermal imaging devices can factor in emissivity of various materials and can have an emissivity table stored in memory and accessible by users. Thermal imaging devices can detect temperatures of various objects as well as atmospheric temperature. Thermal imaging devices can also detect other information such as distance to various objects and relative humidity levels. In some embodiments, multiple thermal imaging devices (e.g., cameras, etc.) are used in a building and data from the devices is stitched together to generate a thermal image of a larger building space (see FIGS. 10-11 for reference). Moreover, these thermal imaging devices can be integrated with other types of cameras such as security cameras throughout a building. Thermal imaging devices can be deployed in various configurations throughout building 10 to perform one or more of the functions described herein. The systems and methods for generating heat maps may be similar or identical to systems and methods disclosed in U.S. Patent Application Publication No. 2021/0011443, published Jan. 14, 2021, the entire disclosure of which is incorporated by reference herein.

Heat map generator 812 may be configured to provide one or more heat maps to model generator 818. In some embodiments, controller 800 can receive a heat map or partial information associated with a heat map (e.g., infrared energy emitted, reflected, and/or transmitted from a zone or space, etc.), which can be directly provided to model generator 818. In such embodiments, heat map generator 812 may not be responsible for generating, either partially or entirely, the heat map for space 828. In some embodiments, heat map generator 812 is substantially similar or identical to heat map generator 906, described in detail below with reference to FIG. 9.

Model generator 818 may be configured dynamic thermal model that is used to predict how the temperatures at the different regions within space 828 will change as function of the control decisions. This type of model may be used in the optimization process to predict the impact of the control decisions. In some embodiments, model generator 818 generates a temperature model of space 828 based on previous heat map data and/or previous setpoint adjustments to IDUs within space 828. For example, model generator 818 may be able to create a model that represents how the heat distribution will occur in response to changing certain temperature setpoints of the IDUs within space 828. The model may consider a number of factors, such as a number of occupants within space 828 and/or the location of the occupants (e.g., within particular zones, etc.), the amount of sunlight entering space 828 and/or the location at which sunlight enters space 828, and the weather outside of space 828.

In some embodiments, model generator 818 may be configured to generate a model that can represent the temperature of each zone, which may consider the factors listed above and/or additional factors, such as zone coupling. The zone may be located within building 10 and may include a room, a set of rooms, a floor, a space, or any other location within building 10. In some embodiments, the zone refers to any instance or location within building 10 that includes a single control loop or multiple control loops. In some embodiments, the zone refers to any building location with one or more HVAC units and/or HVAC equipment (e.g., boilers, AC units, chillers, etc.) implemented within one or more control loops. The zone may be served by HVAC equipment, which may include some or all of the equipment of HVAC system 100, central plant 200, airside system 300, or BMS 400 (e.g., boilers, chillers, air handling units, etc.) and/or some or all of the equipment of VRF system 500, or VRF system 700 (e.g., outdoor VRF units 502, indoor VRF units 604, etc.) as described with reference to FIGS. 5-7. The HVAC equipment may operate to provide heating or cooling $\dot{Q}_{HVAC}$ to the zone to maintain the temperature $T_z$ of the zone at or near a desired temperature (e.g., at a temperature setpoint, within a setpoint range, etc.) to promote the comfort of occupants within the zone and/or to meet other needs of the zone. $\dot{Q}_{HVAC}$ may include heat flow into the zone when the HVAC equipment operates in a heating mode or heat flow out of the zone when the HVAC equipment operate in a cooling mode. $\dot{Q}_{HVAC}$ may have a positive value when the HVAC equipment operates in the heating mode and a negative value when the HVAC equipment operates in the cooling mode.

Controller 800 and the various components therein may include any and all functionality from the systems and methods disclosed in U.S. patent application Ser. No. 16/906,562 filed Jun. 19, 2020, the entire disclosure of which is incorporated by reference herein. Furthermore, space 328 may be modeled using any and all functionality from the systems and methods disclosed in U.S. patent application Ser. No. 17/388,776, filed Jul. 29, 2021, the entire disclosure of which is incorporated by reference herein.

The zone air may include air within the zone and can be modeled as having a zone air temperature $T_{ia}$ and a thermal capacitance $C_{ia}$. Zone air temperature $T_{ia}$ may be affected by several sources of heat transfer including heating or cooling $\dot{Q}_{HVAC}$ provided by HVAC equipment, heat $\dot{Q}_m$ exchanged between the zone air and the building mass, heat $\dot{Q}_a$ exchanged between the zone air and the ambient air outside the zone, and heat $\dot{Q}_{other}$ generated by the heat load within the zone. A temperature sensor 830 may be positioned within the zone and configured to measure the zone air temperature $T_{ia}$. Temperature sensor 830 may communicate the zone air temperature $T_{ia}$ to controller 800, which operates to control the HVAC equipment.

In some embodiments, the building mass includes non-air mass within the zone (e.g., walls, floors, ceilings, furniture, solid objects, etc.) which can exchange heat $\dot{Q}_m$ with the zone air. The building mass can be modeled as having a mass temperature $T_m$ and a thermal capacitance $C_m$. The building mass may reject heat $\dot{Q}_m$ to the zone air when the mass temperature $T_m$ is greater than the zone air temperature $T_{ia}$ or may absorb heat $\dot{Q}_m$ from the zone air when the mass temperature $T_m$ is less than the zone air temperature $T_{ia}$. Accordingly, the value of $\dot{Q}_m$ may be positive when the building mass rejects heat to the zone air and negative when the building mass absorbs heat from the zone air.

In some embodiments, the heat load may include occupants within the zone (e.g., people, animals, etc.) that produce body heat as well as computers, lighting, and/or other electronic devices that generate heat through electrical resistance. In some embodiments, the heat load includes sunlight that transfers heat into zone via solar irradiance or other sources of heat transfer into the zone via thermal radiation. The total amount of heat generated by the heat load can be modeled as $\dot{Q}_{other}$.

The ambient air within a zone of space 828 may include outdoor air or air within another building zone (e.g., of space 328, outside of space 328, etc.) that exchanges heat $\dot{Q}_a$ with the zone air. The temperature $T_{oa}$ of the ambient air may be measured by a temperature sensor (e.g., sensor 830, etc.) and provided as an input to controller 800. The ambient air may reject heat $\dot{Q}_a$ to the zone air when the ambient air temperature $T_{oa}$ is greater than the zone air temperature $T_{ia}$ or may absorb heat $\dot{Q}_a$ from the zone air when the ambient air temperature $T_{oa}$ is less than the zone air temperature $T_{ia}$. Accordingly, the value of $\dot{Q}_a$ may be positive when the ambient air rejects heat to the zone air or negative when the ambient air absorbs heat from the zone air.

Controller 800 may receive the temperature measurements $T_{ia}$ and $T_{oa}$ from sensors 830-834 and provide control signals to the IDUs serving space 828 based on a model generated by model generator 818. In some embodiments, the control signals include heating or cooling duties for HVAC equipment (e.g., the IDUs serving space 828, etc.). Advantageously, controller 800 may consider the sources of heat transfer provided by the heat load (e.g., $\dot{Q}_{other}$), the building mass (e.g., $\dot{Q}_m$), and the ambient air (e.g., $\dot{Q}_a$) on the zone air temperature $T_z$ and may operate HVAC equipment to provide a suitable amount of heating or cooling $\dot{Q}_{HVAC}$ to maintain the zone air temperature $T_{ia}$ within an acceptable range.

For example, model generator 818 may generate a model that represents the temperature of a zone within space 828 as:

$$T_{z,i,k+1} = -\left(\frac{1}{R_{mi}C_{ia}} + \frac{1}{C_{ia}R_{oi}}\right)T_{z,i,k} + \frac{1}{C_{ia}R_{mi}}T_{m,i,k} + \frac{1}{C_{ia}R_{oi}}T_{oa}[k] + \dot{Q}_{HVAC,i,k} + \frac{1}{C_{ia}}\dot{Q}_{other,i,k} - \sum_{i \neq j}\frac{1}{C_{ia}}\beta_{i,j}(T_{z,i,k} - T_{z,j,k})$$

Where $T_{z,i,k}$ is the ith zone temperature at instant k, $T_{m,i,k}$ is the ith zone shallow mass temperature at instant k, and $\beta_{i,j}$ is the degree of coupling between two adjacent zones. In the above example, if two zones are not adjacent, $\beta_{i,j}=0$. The addition of the coupling between the zones may maintain the linearity of the zone dynamics constraints in the optimization problem.

Although the above example applies to a single building zone, the systems and methods described herein are also applicable to multi-zone systems (e.g., multi-zone systems within space 828, etc.). In the case of a multi-zone system, each zone may have its own values of $T_{ia}$, $C_{ia}$, $T_m$, and $C_m$, which could be aggregated or averaged to determine the value to use in the model.

Still referring to FIG. 8, optimizer 820 may then be configured to use the heat map information received externally or generated to represent space 828 and/or a model generated by model generator 818 of space 828, along with any received constraints and an objective function to perform an optimization process to provide substantially equal temperature distribution within space 828. The model may be used in conjunction with the current heat map data to make determinations that are not provided in the real-time data. For example, the model of building space 828 may be used to predict the zone temperatures as a function of an amount of heat transfer between two or more adjacent zones within space 828.

In some embodiments, the optimization process includes optimizing an objective function or cost function to determine optimal values for the temperatures in the respective zones. In some embodiments, the objective function may consider both the comfort level each temperature, the energy prices, and the energy required to achieve that temperature, as well as any constraints on the system (e.g., temperatures must be within 66°-74°, etc.). The constraints (e.g., prices, penalties, etc.) can be used within the objective function can be updated while the model is running closed-loop and controlling the process (e.g., while processing the heat map in real time, etc.). Changes in desired comfort level, energy prices, etc. can cause the model to manipulate the operating conditions to yield to most desirable environment (e.g., one that has mostly equal temperature distribution at a relatively low cost of energy, etc.).

In some embodiments, the optimization process is using an objective function to minimize the cost of energy. In such embodiments, the cost of energy consumed over a duration of time is minimized by selecting temperatures that also conform to the imposed constraints (e.g., temperature max. and temperature min., etc.). In some embodiments, the optimization process is using an objective function to minimize the total energy consumed over the duration of the optimization period. In other embodiments, optimization process may attempt to minimize greenhouse gas emissions and/or carbon emissions. In some embodiments, the primary objective of the optimization is something other than temperature (e.g., cost, energy consumption, carbon, etc.) so that the temperature-related considerations can be imposed as penalties or constraints as described. Of course, the temperatures of various heat transfer devices within space 828 may be adjusted to optimize any number of processes with various constraints and/or penalties, and are not limited to the examples disclosed herein.

In some embodiments, optimizer 820 may use a cost model to define the cost incurred (either in terms of monetary cost, energy, carbon emissions, etc.) as a function of the control decisions and also predicts temperature within each zone as a function of the control decisions using the thermal model of the space. These two models together (i.e., cost model and thermal model) may then be used by optimizer 820 to minimize cost while achieving the uniform temperature distribution. In such an example, a constraint may be placed on the system that prevents the adjusted temperature from falling outside of the range of 68°-73°, and thus optimizer 820 needs to determine the cheapest (e.g., energy cost-wise) way to provide substantially equal temperature distribution within this range.

In some embodiments, the constraint or penalty of the objective function is implemented as an additional fictitious cost term in the objective function that is not a true financial/energy cost, but rather imposes an additional "cost penalty" based on the differences between the zone temperatures. Therefore, the objective function as a whole would may be minimizing the sum of actual cost (financial, energy, carbon, etc.) plus penalty cost (e.g., based on temperature differences between zones).

In some embodiments, the constraint or penalty of the objective function includes a temperature variation constraint that requires the differences between the zone temperatures predicted using the model to be less than or equal to one or more threshold values. Optimizer 820 may determine the amount of heat to transfer into or out of each of the plurality of zones by using the temperature variation constraint to prevent setpoint manager 824 from generating control decisions that would violate the temperature variation constraint.

In some embodiments, optimizer 820 may determine an occupancy status of a zone within space 828 that indicates whether the zone is occupied. In some embodiments, the penalty or constraint can be dynamically updated based on occupancy status to drop any unoccupied zones (e.g., or assign them a lower penalty or less restrictive constraint) so that the optimization process would not care so much about the temperature of those unoccupied zones being different from the occupied zones. Optimizer 820 may then adjust a value of a constraint or penalty associated with the zone based on the occupancy status. This data may be provided to optimizer 820 externally or via one or more occupancy sensors (not shown).

In some embodiments, in order to minimize cost and/or maximize comfort by having an equal (e.g., or substantially equal, etc.) temperature distribution in space 328 consisting of multiple zones, additional constraints may be added to the optimization problem and/or penalty terms may be added to the cost function in order to avoid infeasibility. For example, the following component may be added to a cost function for solving the optimization problem:

$$J = \ldots + \Sigma c_i \delta_i + \ldots$$

Such that $$T_{z,1,k} - T_{z,2,k} \leq \delta_1$$
$$T_{z,1,k} - T_{z,2,k} \geq -\delta_1$$
$$\vdots$$
$$T_{z,i,k} - T_{z,j,k} \leq \delta_l$$
$$T_{z,i,k} - T_{z,j,k} \geq -\delta_l$$

Where J represents the cost function with the additional penalty term, c is the cost penalty imposed per unit of the delta variable $\delta$, and the delta variables are defined as the temperature differences between zones in the subsequent equations. In some embodiments, number of auxiliary variables, cost terms, and set of constraints may be dependent on the combinations of adjacent zones.

The optimization problem may take into account additional factors (e.g., occupancy of zones, zone/space schedules, etc.) to determine which constraints to be added to the optimization problem. For example, if a zone within space 328 is not occupied, it may be determined that there is not a need to maintain a uniform temperature across that particular zone. A multiplicative flag may be applied to the constraints which can be set to zero to turn off these constraints and set to 1, when the space is occupied. In some embodiments, the flag may be set to some value between zero and one as well.

Setpoint manager 824 may be configured to manage the multiple updates to set points for one or more of the IDUs within space 828. In some embodiments, setpoint manager 826 may be configured to continually provide different control signals to a variety of the IDUs in space 828 to maintain substantially equal heat distribution.

Figure 9A:
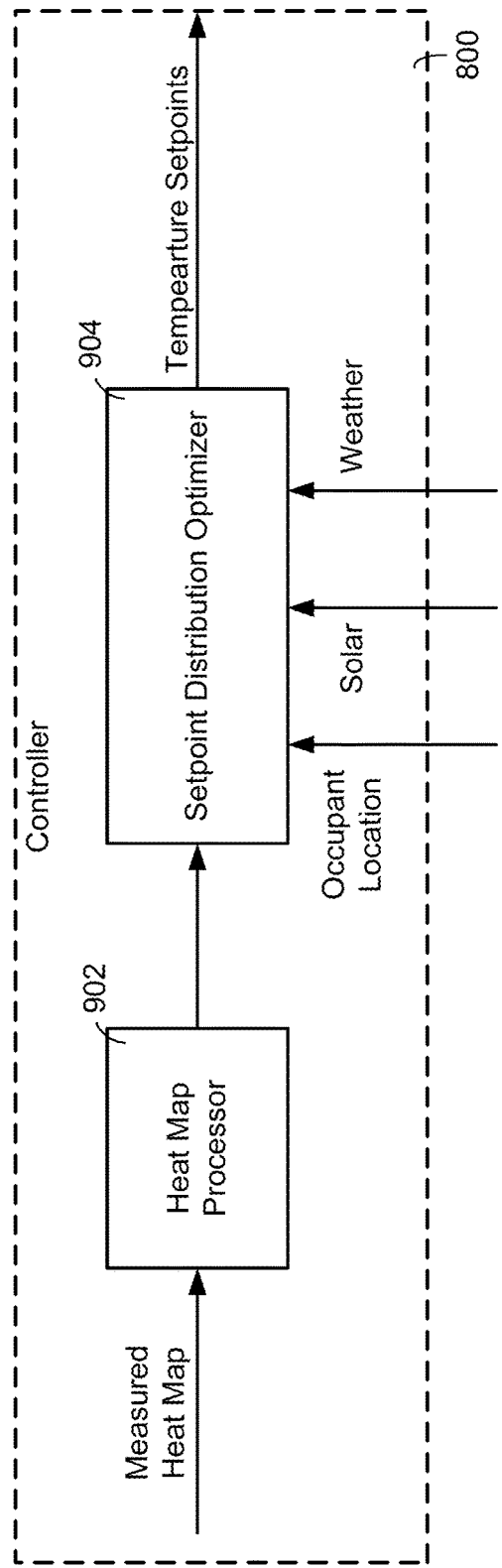
FIG. 9A is a block diagram of a controller performing setpoint optimization using a received heat map, which can be implemented by the controller of FIG. 8, according to some embodiments.

Referring now to FIG. 9A, a block diagram of controller 800 performing some or all of the processing for determining equal (e.g., or substantially equal) heat distribution within space 328. Model generator 818 and/or optimizer 822, may be configured to perform some or all of the processes of controller 800 shown in FIG. 9A. Additionally, some or all of heat map processor 902 and setpoint distribution optimizer 904 and the functionality thereof can be incorporated partially or entirely within model generator 818. FIG. 9A shows heat map processor receiving a measured heat map (e.g., data indicating the infrared energy emitted, reflected, and/or transmitted by materials within space 328, etc.).

In some embodiments, heat map processor 902 provides heat data to setpoint distribution optimizer 904. Heat map processor 902 may modulate the received heat map and determine an estimated modular temperature at multiple locations within space 328, based on the colors provided on the heat map. These modular temperatures at multiple locations within space 328 may then be provided to setpoint distribution optimizer 904 for optimization. It should be noted that this embodiment for processing a received heat map is merely meant to be exemplary and should not be considered limiting.

Setpoint distribution optimizer 904 may be configured to receive the data from heat map processor 902, receive additional data relating to variables affecting heat within space 328 (e.g., occupant location, solar effects, weather, etc.) and generate temperature setpoints for the one or more IDUs within space 328. Setpoint distribution optimizer 904 may determine temperature setpoints for one or more of the IDUs using a variety of methods.

Figure 9B:
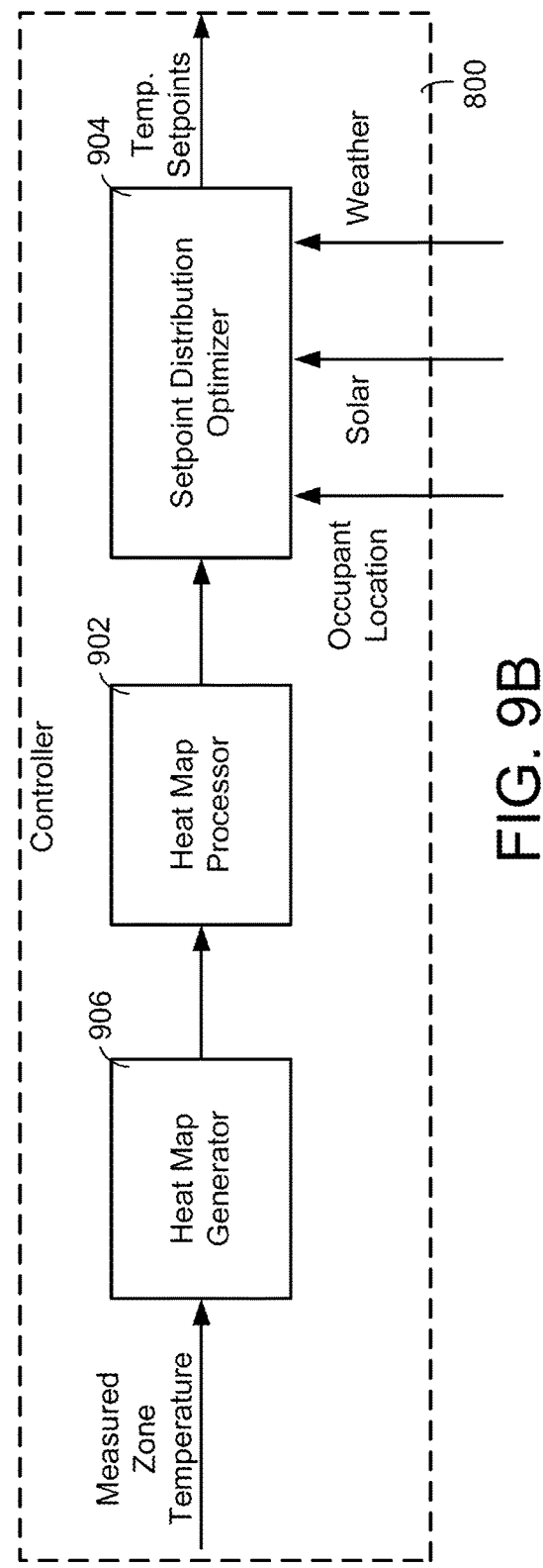
FIG. 9B is a block diagram of a controller performing setpoint optimization using a generated heat map, which can be implemented by the controller of FIG. 8, according to some embodiments.

Referring now to FIG. 9B, a block diagram of controller 800 generating a heat map, processing a heat map, and determining temperature setpoints for one or more IDUs within space 328. The processing of controller 800 as shown in FIG. 9B may be similar to that of the processing of controller 800 as shown in FIG. 9A, but may further include generating a heat map as opposed to receiving an already generated heat map. FIG. 9B is shown to include heat map generator 906, heat map processor 902, and setpoint distribution optimizer 904.

Heat map generator 906 may be or include processing that receives data from one or more thermal imaging devices to generate a representation of data in the form of a map or diagram in which data values (e.g., temperature values, heat values, etc.) are represented as colors. In some embodiments, heat map generator 906 receives temperature measurements from sensors (e.g., sensors 830-834, etc.) and uses this temperature data to generate the colors within the heat map. Then, heat map generator 906 may provide the heat map data to heat map processor 902, which may resemble the process outlined in FIG. 9A.

Figure 10:
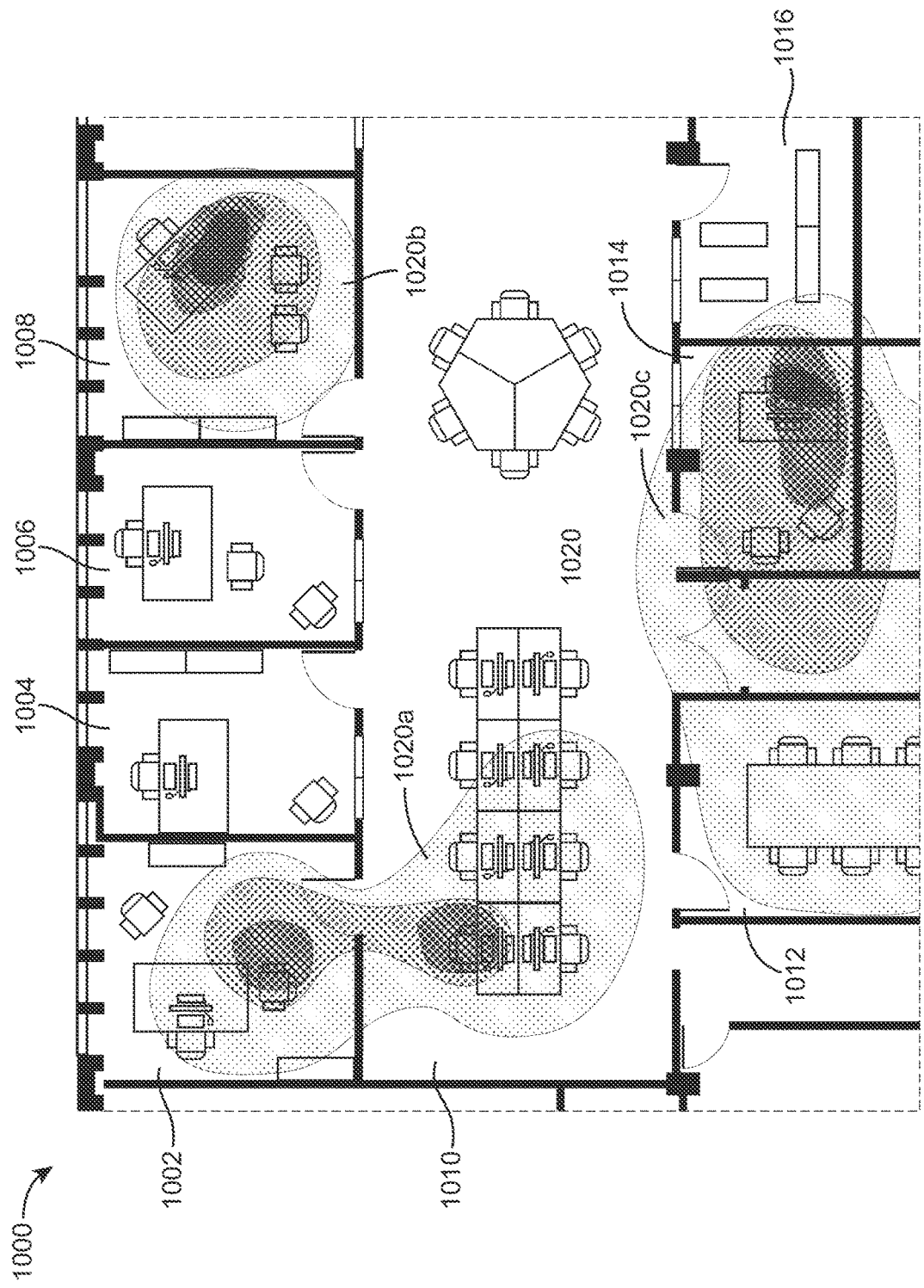
FIG. 10 is a diagram of a heat map of a building space with rooms, which can be generated by the controller of FIG. 8, according to some embodiments.
Figure 11:
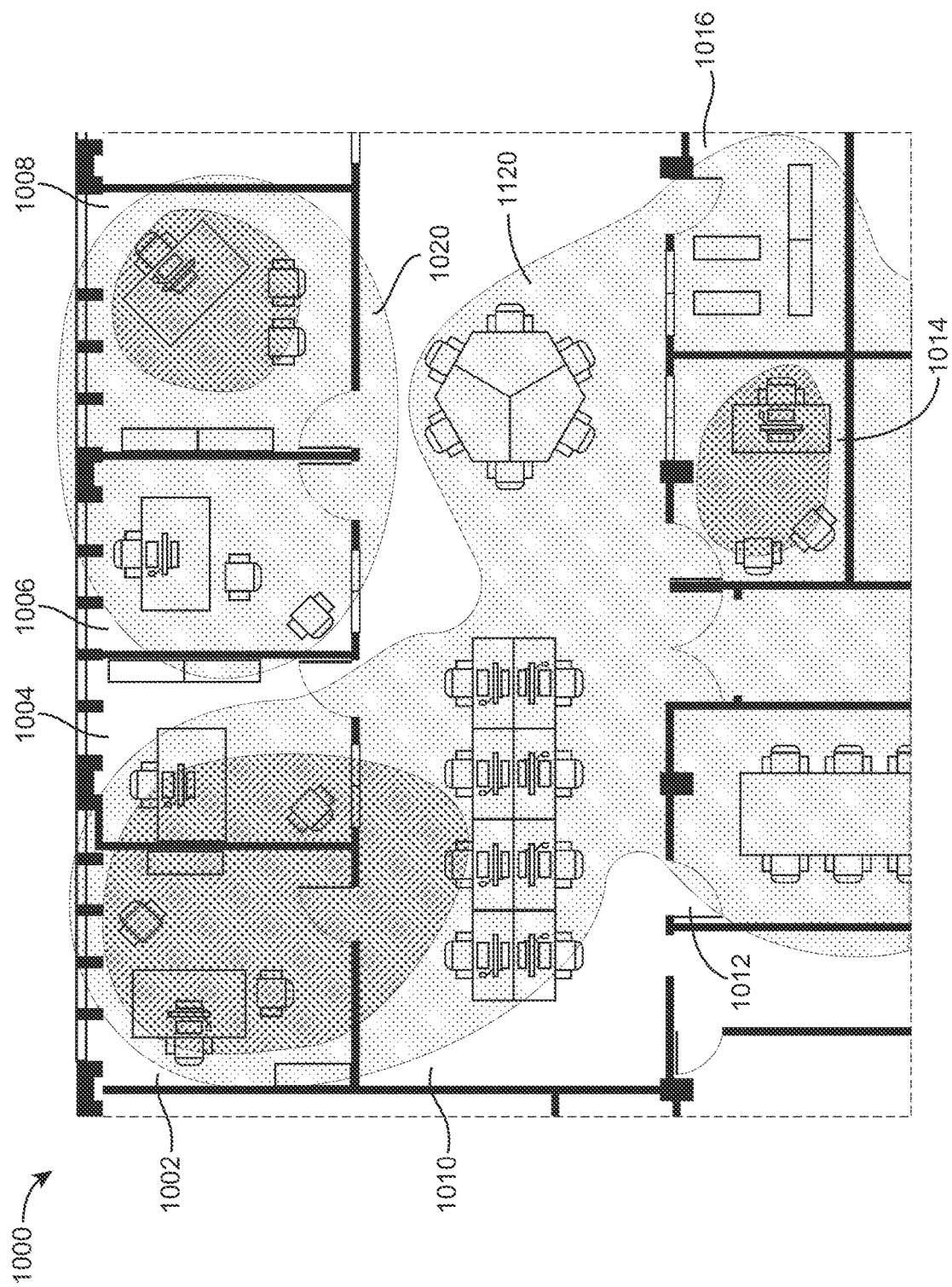
FIG. 11 is a diagram of a heat map of a building space with rooms, which can be generated by the controller of FIG. 8, according to some embodiments.

Referring now to FIGS. 10-11, a diagram of heat map 1000 is shown, according to some embodiments. In some embodiments, heat map 1000 represents a color-based map of space 1000, which may be substantially similar or identical to space 828. Referring specifically to FIG. 11, heat map 1020 may be configured to show unequal temperature distribution within space 1000. Space 1000 is shown to include rooms 1002, 1004, 1006, 1008, 1010, 1012, 1014, 1016, and 1018. Heat map 1020 is shown to include heat regions 1020a, 1020b, and 1020c. Heat regions 1020a-c may show regions of space 1000 at a significantly greater temperature (e.g., as shown within the center of region 1020c, etc.) than other areas within space 1000 (e.g., within room 1006, etc.). The systems and methods disclosed herein may be utilized to substantially equalize the heat distribution throughout space 1000.

In some embodiments, after these processes have been implemented to substantially equalize the heat distribution throughout space 1000, a new heat map is generated or heat map 1020 is updated, to result in heat map 1120, as shown in FIG. 11. Heat map 1120 as shown in FIG. 11 shows a more equalized heat distribution in space 1000 than as shown in heat map 1020. Specifically, a greater portion of space 1000 maintains a more uniform heat distribution, while there are less intense pockets of higher temperatures.

While FIGS. 10-11 generally refer to space 1000 including multiple rooms, this is merely meant to be exemplary and should not be considered limiting. Any of the spaces considered herein, including space 1000, can be a single space (e.g., cafeteria, auditorium, etc.), a space with multiple rooms, and anything in between.

Figure 12:
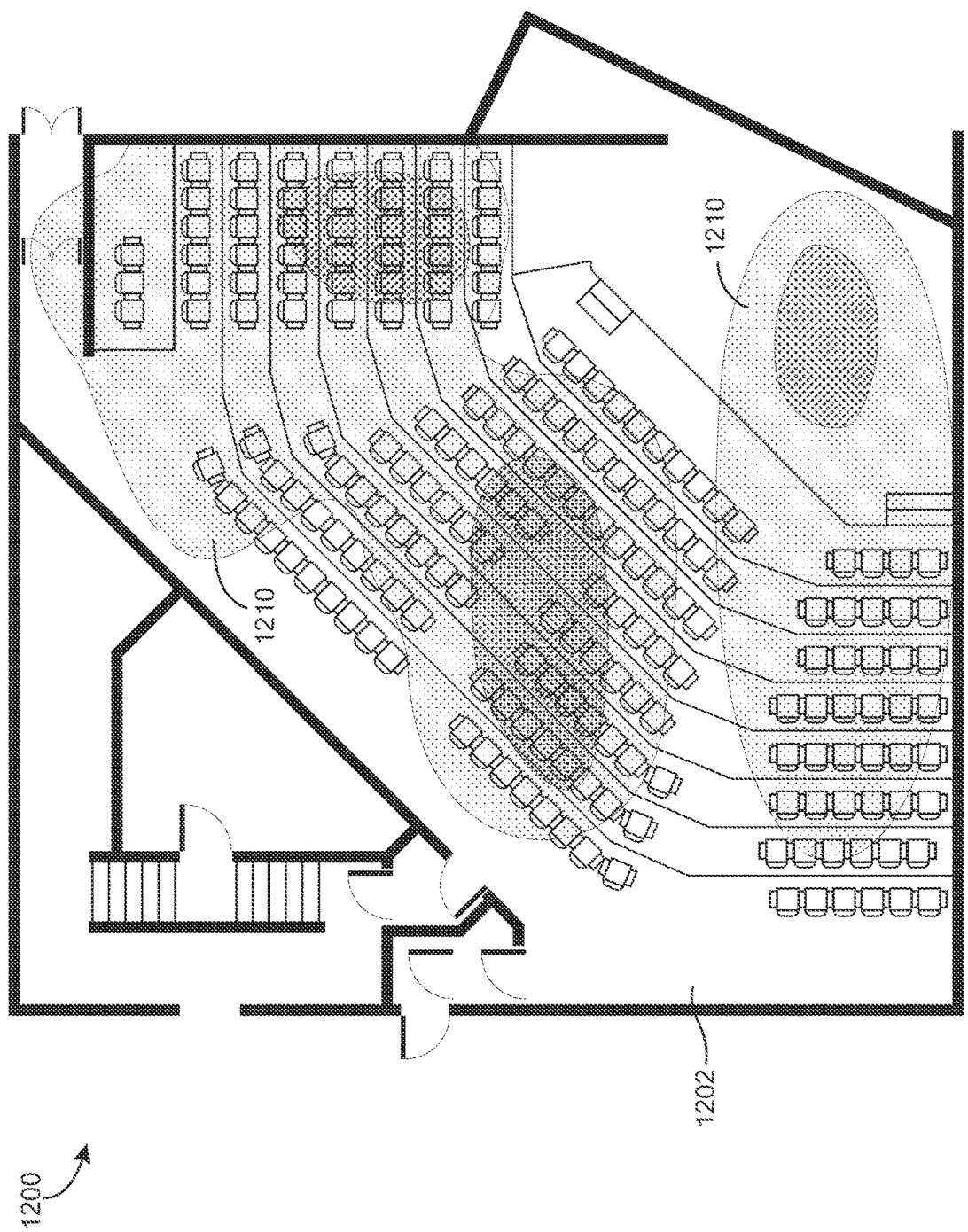
FIG. 12 is a diagram of a heat map of an open floor building space, which can be generated by the controller of FIG. 8, according to some embodiments.

Referring now to FIG. 12, another diagram of heat map 1020 is shown, according to some embodiments. Diagram 1200 is shown to include heat map 1210 and open space 1202. As shown in FIG. 12, open space 1202 is an open floor space, such that the zones within the space are not limited to regions enclosed (either partially or entirely) by walls, or other obstructions (e.g., cubicle walls, etc.). While the systems and methods disclosed herein are generally referring to spaces containing zones, where the zones are separate rooms within the space, this is merely meant to be exemplary and should not be considered limiting.

As clearly shown in FIG. 12, the zones can be areas within an open floor space. Heat map 1210 shows substantially equal temperature distribution throughout multiple areas of open space 1202. While not shown, these temperature distributions can be across multiple zones, in separate zones, or a combination thereof. In some embodiments, the multiple zones span different areas of open space 1202 and are modeled as such.

Figure 13:
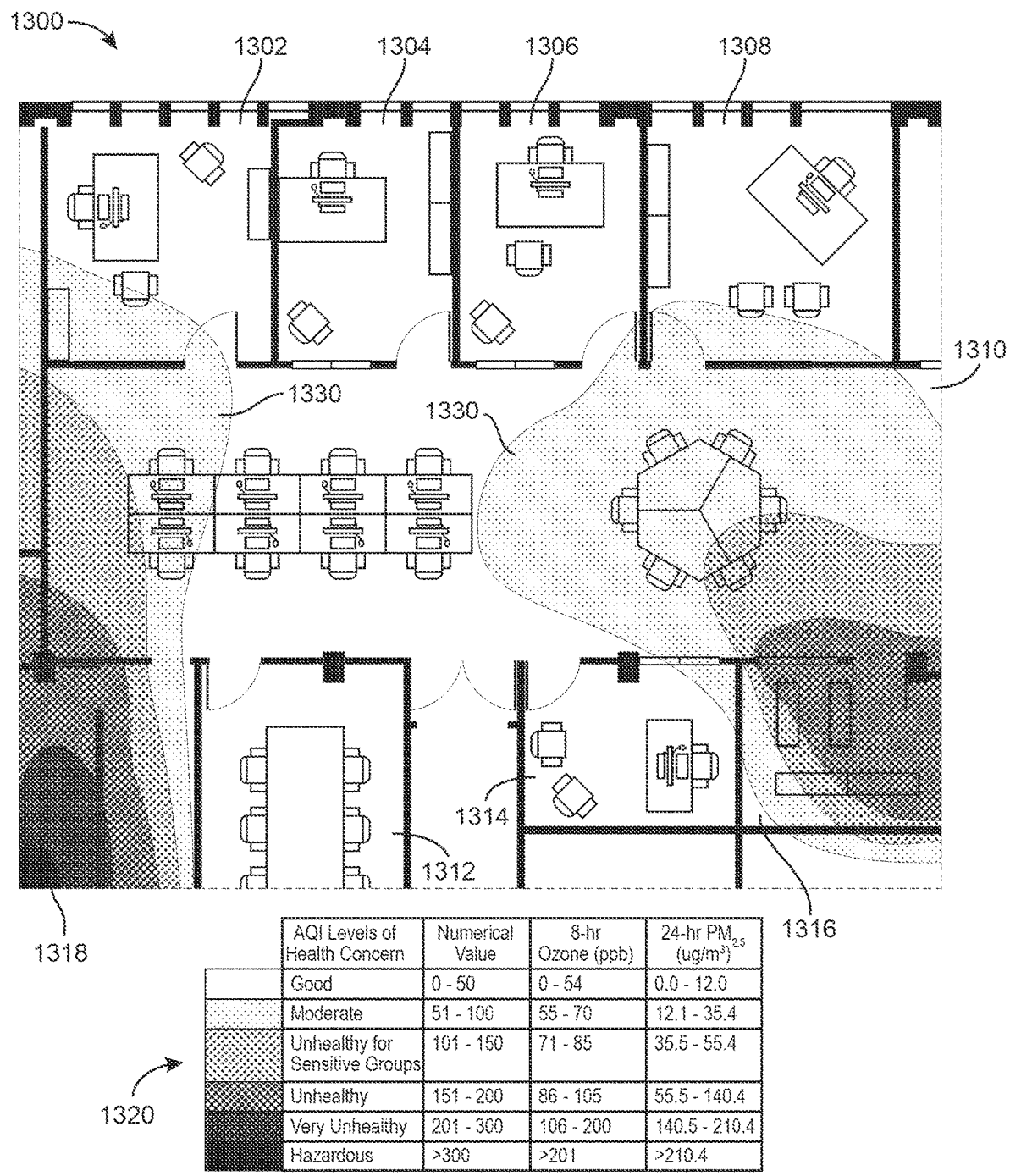
FIG. 13 is a diagram of an air index map, which can be generated by the controller of FIG. 8, according to some embodiments.

Referring now to FIG. 13, an air quality index (AQI) map 1300 is shown, according to some embodiments. FIG. 13 is shown to include AQI map 1300 and graph 1320. AQI map 1300 is shown to include zones 1302, 1304, 1306, 1308, 1310, 1312, 1314, 1316, AQI region 1330, and space 1318. In some embodiments space 1318 is the entire space (e.g., the floor, entire region) in which all of the zones are located therein. For example, all of zones 1302-1316 are within space 1318.

As mentioned above, while the systems and methods disclosed herein are generally referring to heat maps being utilized and/or processed to perform substantially equal temperature distribution, this is merely meant to be exemplary and should not be considered limiting. In some embodiments, such as those described with reference to FIG. 13, other types of maps, such as AQI maps, can be processed to determine air quality data regarding a space. The AQI data can then be used in conjunction with an objective function to optimize a control process. Examples of this are described in detail below.

Graph 1320 shows a key (e.g., legend, etc.) for understanding the different marks/shading represented in diagram 1300. In some embodiments, graph 1320 shows the AQI levels for multiple AQI attributes (described below) and the varying risk levels thereof. For example a 60 ppb of Ozone within an 8-hr period is considered a "moderate" health risk. In some embodiments, this data is shown on AQI map 1300 can be processed (e.g., by controller 800, etc.) and information relating to the AQI data for multiple AQI attributes can be used, along with an optimization process, to perform a type of optimization control.

For example, controller 800 may be configured to receive AQI data (e.g., from AQI map 1320) indicating the amount of carbon dioxide concentrations in the air throughout space 1300. Optimizer 820 may then use an objective function to minimize the cost of energy by maintaining the levels of carbon dioxide below a predetermined threshold throughout the space. In such embodiments, the cost of energy consumed over a duration of time is minimized by selecting filtering techniques (e.g., air filtration fans/vacuums, etc.) that also conform to the imposed constraints (e.g., maximum $CO_2$ levels, maximum energy costs, etc.). The optimization process may be using an objective function to minimize the total energy consumed over the duration of the optimization period. In other embodiments, optimization process may attempt to minimize $CO_2$ levels as much as possible regardless of the cost.

In another example, controller 800 may be configured to receive AQI data relating to Ozone levels within space 1318, and use the received AQI data, along with an objective function, to minimize health risks associated with Ozone levels. As such, constraints may be placed on the optimization process such that a certain "level" of health risk (e.g., moderate risk, unhealthy risk, etc.) may not be exceeded in any zone of the space 1318 while attempting to minimize ozone within the space 1318 and the multiple zones therein.

Of course, $CO_2$ and Ozone are exemplary attributes that can be represented within AQI map 1320 and should not be considered limiting. Other attributes can be monitored, analyzed, optimized and represented within AQI map 1320, either independently or in combination, such as carbon monoxide (CO), carbon dioxide ($CO_2$), ozone ($O_3$), lead concentrations (Pb), nitrogen dioxide ($NO_2$), particulate matter with a diameter of 10 micrometers or less (PM10), particulate matter with a diameter of 2.5 micrometers or less (PM2.5), and sulfur dioxide ($SO_2$). As described herein, the term "AQI attribute" may be used to refer to one or more of these air quality characteristics described above.

In some embodiments, optimizer 820 may use a cost model to define the cost incurred (either in terms of monetary cost, energy, carbon emissions, etc.) as a function of the control decisions and also predicts AQI attribute (e.g., $CO_2$, etc.) levels within each zone as a function of the control decisions using an AQI model of the space (e.g., generated by model generator 810, etc.). Both models together (i.e., cost model and AQI model) may then be used by optimizer 820 to minimize cost while achieving the uniform $CO_2$ levels. In such an example, a constraint may be placed on the system that prevents the adjusted $CO_2$ levels from being any greater than 400 ppm, and thus optimizer 820 needs to determine the cheapest (e.g., energy cost-wise) way to provide substantially equal $CO_2$ levels while conforming to this constraint.

In some embodiments, the constraint or penalty of the objective function is implemented as an additional fictitious cost term in the objective function that is not a true financial/energy cost, but rather imposes an additional "cost penalty" based on the differences between AQI attribute levels within the zones. Therefore, the objective function as a whole would may be minimizing the sum of actual cost (financial, energy, carbon, etc.) plus penalty cost (e.g., based on $CO_2$ differences between zones).

In some embodiments, the constraint or penalty of the objective function includes a AQI attribute variation constraint that requires the differences between the AQI attribute levels within the zones predicted using the model to be less than or equal to one or more threshold values. Optimizer 820 may determine the amount of heat to transfer into or out of each of the plurality of zones by using the temperature variation constraint to prevent setpoint manager 824 from generating control decisions that would violate the temperature variation constraint.

In some embodiments, optimizer 820 may determine an occupancy status of a zone within space 828 that indicates whether the zone is occupied. In some embodiments, the penalty or constraint can be dynamically updated based on occupancy status to drop any unoccupied zones (e.g., or assign them a lower penalty or less restrictive constraint) so that the optimization process would not care so much about the AQI attribute of those unoccupied zones being different from the occupied zones. Optimizer 820 may then adjust a value of a constraint or penalty associated with the zone based on the occupancy status. This data may be provided to optimizer 820 externally or via one or more occupancy sensors (not shown).

The optimization problem may take into account additional factors (e.g., occupancy of zones, zone/space schedules, etc.) to determine which constraints to be added to the optimization problem. For example, if a zone within space 328 is not occupied, it may be determined that there is not a need to perform a substantially equal minimization of harmful AQI attributes within those particular zones. Similar to the heat map processes described above, a multiplicative flag may be applied to the constraints which can be set to zero to turn off these constraints and set to 1, when the space is occupied. In some embodiments, the flag may be set to some value between zero and one as well.

Predictive Control Processes Using Heat Maps

Figure 14:
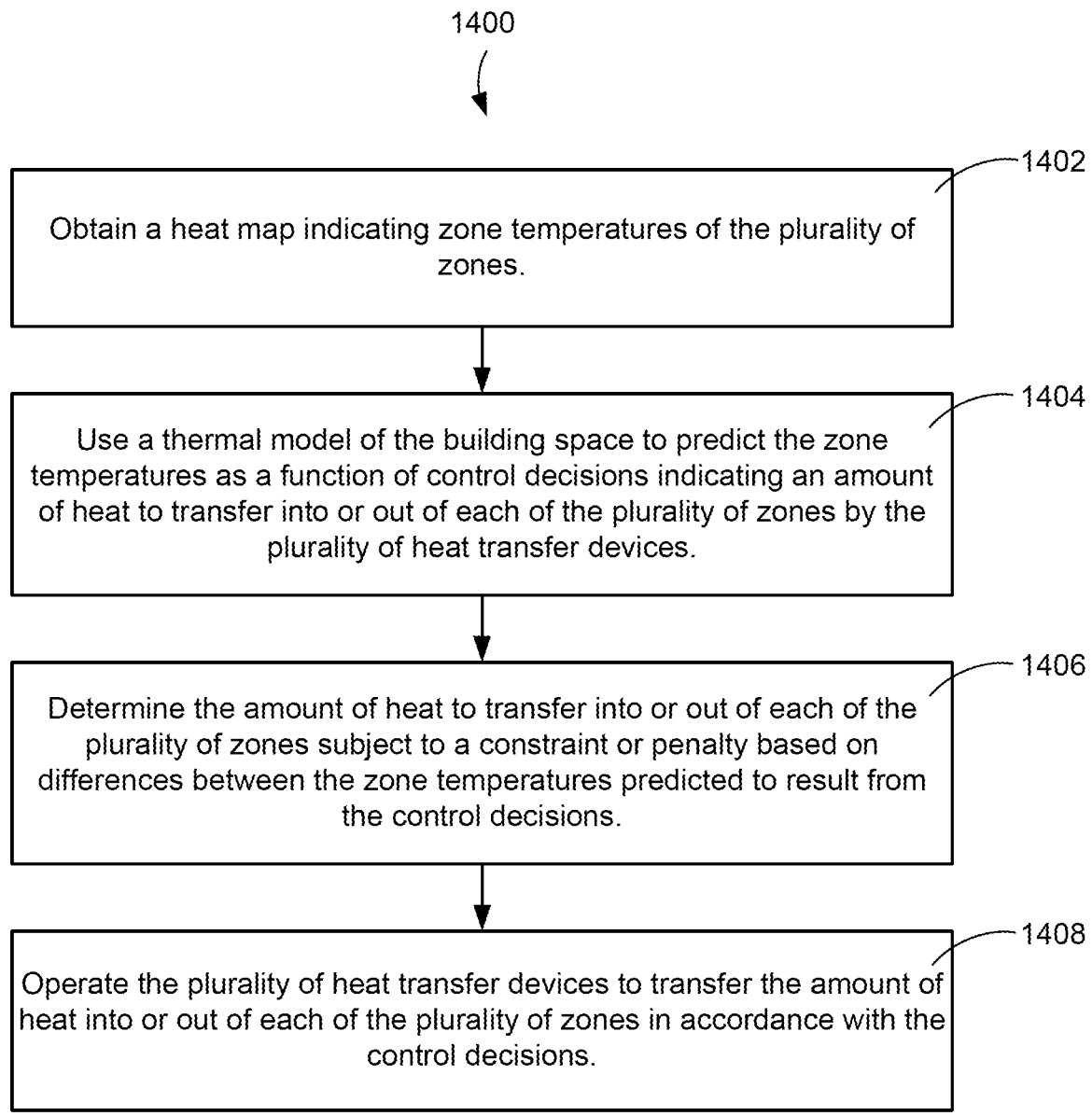
FIG. 14 is a flow diagram of a process for performing temperature distribution within a building space, which can be performed by the controller of FIG. 8, according to some embodiments.

Referring now to FIG. 14, a flow diagram of process 1400 is shown, according to some embodiments. Process 1400 may be performed partially or entirely by any of the processing components described herein. For example, process 1400 may be performed partially or entirely by controller 800.

Process 1400 is shown to include obtaining a heat map indicating zone temperatures of the plurality of zones (step 1402). As described herein, obtaining a heat map can include generating a heat map or receiving a heat map from an external source. In some embodiments, heat map processor 902 may obtain heat map 1020 via an external source (e.g., an external server, etc.). In other embodiments, controller 800 obtains heat map 1020 by generating heat map 1020 via heat map generator 906. The heat map may include information about the intensity of the temperature and/or heat across space 828 using color. In some embodiments, the color acts as a visualization technique that shows the magnitude of the temperature as color in two dimensions (e.g., as shown in FIGS. 10-11, etc.).

Process 1400 is shown to include using a thermal model of the building space to predict the zone temperatures as a function of control decisions indicating an amount of heat to transfer into or out of each of the plurality of zones by the plurality of heat transfer devices (step 1204). As described above, model generator 818 may generate a model of space 828 which may represent the temperature effects within space 828. The model may then be provided to optimizer 820 such that optimizer 820 can perform an optimization process based on the received model, the current heat map data, and one or more constraints to minimize energy cost and/or maximize comfort by having an equal (e.g., or substantially equal, etc.) temperature distribution in space 328.

Process 1400 is shown to include determining the amount of heat to transfer into or out of each of the plurality of zones subject to a constraint or penalty based on differences between the zone temperatures predicted to result from the control decisions (step 1406). In some embodiments, optimizer 820 determines the amount of heat to transfer into or out of one or more zones by performing the optimization process. Various optimization processes can be considered and are described above. In one example, optimizer 820 attempts to minimize the amount of energy used over the duration of the optimization process, while conforming to various constraints imposed on the system, such as temperature range constraints (e.g., the temperature cannot exceed 75°, etc.).

Process 1400 is shown to include operating the plurality of heat transfer devices to transfer the amount of heat into or out of each of the plurality of zones in accordance with the control decisions (step 1408). Setpoint manager 824 may be configured to provide the updated control signals to one or more of the IDUs serving space 828. In some embodiments the setpoints for one or more of the IDUs can be optimized and provided to the IDUs at periodic intervals (e.g., every 10 minutes, every hour, etc.) or in real time.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A heating, ventilation, or air conditioning (HVAC) system for reducing temperature variation within a building space, the HVAC system comprising:
    a plurality of heat transfer devices distributed across a plurality of zones of the building space and operable to transfer heat into or out of the plurality zones;
    a controller comprising one or more processing circuits configured to:
        obtain a heat map indicating zone temperatures of the plurality of zones;
        use a thermal model of the building space to predict the zone temperatures as a function of control decisions indicating an amount of heat to transfer into or out of each of the plurality of zones by the plurality of heat transfer devices;
        determine the amount of heat to transfer into or out of each of the plurality of zones subject to a constraint or penalty, wherein the constraint or penalty comprises a penalty term and determining the amount of heat to transfer into or out of each of the plurality of zones comprises calculating a value of the penalty term based on differences between the zone temperatures predicted to result from the control decisions; and
        operate the plurality of heat transfer devices to transfer the amount of heat into or out of each of the plurality of zones in accordance with the control decisions.

2. The HVAC system of claim 1, wherein:
    determining the amount of heat to transfer into or out of each of the plurality of zones comprises performing an optimization of an objective function subject to the constraint or penalty based on the differences between the zone temperatures predicted to result from the control decisions; and
    the control decisions indicating the amount of heat to transfer into or out of each of the plurality of zones by the plurality of heat transfer devices are generated as a result of performing the optimization.

3. The HVAC system of claim 1, wherein:
    the heat map indicates which of the plurality of zones are located adjacent to each other and capable of exchanging heat with each other; and
    the thermal model of the building space is used to predict the zone temperatures as a function of an amount of heat transfer between two or more of the plurality of zones that are located adjacent to each other.

4. The HVAC system of claim 1, wherein:
    the constraint or penalty comprises a temperature variation constraint that requires the differences between the zone temperatures predicted using the thermal model to be less than or equal to one or more threshold values; and
    determining the amount of heat to transfer into or out of each of the plurality of zones comprises using the temperature variation constraint to prevent the controller from generating control decisions that would violate the temperature variation constraint.

5. The HVAC system of claim 1, wherein the one or more processing circuits are configured to:

determine an occupancy status of a zone of the plurality of zones, the occupancy status indicating whether the zone is occupied; and adjust a value of the constraint or penalty associated with the zone based on the occupancy status.

6. The HVAC system of claim 1, wherein:
the one or more processing circuits are configured to estimate a plurality of heat load disturbances affecting the plurality of zones; and
the thermal model of the building space is used to predict the zone temperatures as a function of the heat load disturbances.

7. The HVAC system of claim 1, wherein the plurality of heat transfer devices comprise indoor units of a variable refrigerant flow system, each of the indoor units located within a different zone of the plurality of zones.

8. A method for operating a heating, ventilation, or air conditioning (HVAC) system to reduce temperature variation within a building space, the method comprising:
obtaining a heat map indicating zone temperatures of a plurality of zones of the building space;
using a thermal model of the building space to predict the zone temperatures as a function of control decisions indicating an amount of heat to transfer into or out of each of the plurality of zones;
determining the amount of heat to transfer into or out of each of the plurality of zones subject to a constraint or penalty based on differences between the zone temperatures predicted to result from the control decisions, wherein the constraint or penalty comprises a temperature variation constraint that requires the differences between the zone temperatures predicted using the thermal model to be less than or equal to one or more threshold values, wherein determining the amount of heat to transfer into or out of each of the plurality of zones comprises using the temperature variation constraint to prevent generating control decisions that would violate the temperature variation constraint; and
operating a plurality of heat transfer devices distributed across the plurality of zones to transfer the amount of heat into or out of each of the plurality of zones in accordance with the control decisions.

9. The method of claim 8, wherein:
determining the amount of heat to transfer into or out of each of the plurality of zones comprises performing an optimization of an objective function subject to the constraint or penalty based on the differences between the zone temperatures predicted to result from the control decisions; and
the control decisions indicating the amount of heat to transfer into or out of each of the plurality of zones by the plurality of heat transfer devices are generated as a result of performing the optimization.

10. The method of claim 8, wherein:
the heat map indicates which of the plurality of zones are located adjacent to each other and capable of exchanging heat with each other; and
the thermal model of the building space is used to predict the zone temperatures as a function of an amount of heat transfer between two or more of the plurality of zones that are located adjacent to each other.

11. The method of claim 8, wherein:
the constraint or penalty comprises a penalty term; and
determining the amount of heat to transfer into or out of each of the plurality of zones comprises calculating a value of the penalty term based on the differences between the zone temperatures predicted to result from the control decisions.

12. The method of claim 8, further comprising:
determining an occupancy status of a zone of the plurality of zones, the occupancy status indicating whether the zone is occupied; and
adjusting a value of the constraint or penalty associated with the zone based on the occupancy status.

13. The method of claim 8, further comprising estimating a plurality of heat load disturbances affecting the plurality of zones; and
wherein the thermal model of the building space is used to predict the zone temperatures as a function of the heat load disturbances.

14. A heating, ventilation, or air conditioning (HVAC) controller for reducing temperature variation within a building space, the HVAC controller comprising one or more processing circuits configured to:
obtain a heat map indicating zone temperatures of a plurality of zones of the building space;
use a thermal model of the building space to predict the zone temperatures as a function of control decisions indicating an amount of heat to transfer into or out of each of the plurality of zones;
determine the amount of heat to transfer into or out of each of the plurality of zones subject to a constraint or penalty, wherein the constraint or penalty comprises a penalty term and determining the amount of heat to transfer into or out of each of the plurality of zones comprises calculating a value of the penalty term based on differences between the zone temperatures predicted to result from the control decisions; and
operate a plurality of heat transfer devices distributed across the plurality of zones to transfer the amount of heat into or out of each of the plurality of zones in accordance with the control decisions.

15. The HVAC controller of claim 14, wherein:
determining the amount of heat to transfer into or out of each of the plurality of zones comprises performing an optimization of an objective function subject to the constraint or penalty based on the differences between the zone temperatures predicted to result from the control decisions; and
the control decisions indicating the amount of heat to transfer into or out of each of the plurality of zones by the plurality of heat transfer devices are generated as a result of performing the optimization.

16. The HVAC controller of claim 14, wherein:
the heat map indicates which of the plurality of zones are located adjacent to each other and capable of exchanging heat with each other; and
the thermal model of the building space is used to predict the zone temperatures as a function of an amount of heat transfer between two or more of the plurality of zones that are located adjacent to each other.

17. The HVAC controller of claim 14, wherein the one or more processing circuits are configured to:
determine an occupancy status of a zone of the plurality of zones, the occupancy status indicating whether the zone is occupied; and
adjust a value of the constraint or penalty associated with the zone based on the occupancy status.

* * * * *